US009456584B2

(12) United States Patent
McLaughlin

(10) Patent No.: US 9,456,584 B2
(45) Date of Patent: Oct. 4, 2016

(54) LIVESTOCK CONTROL AND MONITORING SYSTEM AND METHOD

(71) Applicant: Kim McLaughlin, Watertown, NY (US)

(72) Inventor: Kim McLaughlin, Watertown, NY (US)

( * ) Notice: Subject to any disclaimer, the term of this patent is extended or adjusted under 35 U.S.C. 154(b) by 567 days.

(21) Appl. No.: 13/965,611

(22) Filed: Aug. 13, 2013

(65) Prior Publication Data
US 2014/0352632 A1    Dec. 4, 2014

Related U.S. Application Data

(60) Provisional application No. 61/859,599, filed on May 31, 2013.

(51) Int. Cl.
*A01K 15/02*    (2006.01)
*A01K 11/00*    (2006.01)

(52) U.S. Cl.
CPC .............. *A01K 11/008* (2013.01); *A01K 11/00* (2013.01); *A01K 15/023* (2013.01)

(58) Field of Classification Search
CPC ............. A01K 15/023; A01K 15/021; A01K 11/008; A01K 27/009; A01K 29/005; A01K 15/02; A01K 15/022; A01K 15/029; A01K 11/006; A01K 15/04; A01K 27/001; A01K 5/02; A01K 7/02; G08B 21/0269; G08B 21/0261; G08B 21/0211
USPC ....... 119/721, 720, 719, 908, 718, 859, 712; 340/573.3, 573.1
See application file for complete search history.

(56) References Cited

U.S. PATENT DOCUMENTS

| | | |
|---|---|---|
| 4,652,261 A | 3/1987 | Mech et al. |
| 5,099,797 A | 3/1992 | Gonda |
| 5,241,923 A | 9/1993 | Janning |
| 5,408,956 A | 4/1995 | Quigley |
| 5,608,381 A | 3/1997 | McCarney et al. |
| 5,640,932 A | 6/1997 | Bianco et al. |
| 5,791,294 A * | 8/1998 | Manning .............. A01K 11/008 119/721 |
| 5,868,100 A | 2/1999 | Marsh |

(Continued)

FOREIGN PATENT DOCUMENTS

JP    406237668    8/1994

OTHER PUBLICATIONS

Anderson, D.M. (2007), "Virtual fencing—past, present and future", The Rangeland Journal, Jan. 17, 2007, vol. 29, pp. 65-78, CSIRO PUBLISHING (14 pages).

*Primary Examiner* — Yvonne Abbott-Lewis
(74) *Attorney, Agent, or Firm* — Buchanan Ingersoll & Rooney PC

(57) ABSTRACT

A system and method for controlling and monitoring an animal that includes receiving a plurality of GPS coordinates defining a boundary of a predetermined area in which the animal is to be confined, receiving, via a transceiver, at least one location signal indicating a position of the animal upon which the receiver is mounted via a housing, monitoring, via at least one sensor, a physiological condition of the animal, determining, via a processor in electrical communication with the receiver, whether the animal is within a predetermined distance of a predetermined area, which is defined by a plurality of GPS coordinate, based upon the at least one location signal, and administering a stimulus to the animal via at least one stimulus device attached to the housing and in electrical communication with the processor upon a determination that the animal is within the predetermined distance of the predetermined area.

18 Claims, 15 Drawing Sheets

(56) References Cited

U.S. PATENT DOCUMENTS

| | | | |
|---|---|---|---|
| 6,079,367 A | 6/2000 | Stapelfeld et al. | |
| 6,167,843 B1 | 1/2001 | Kim | |
| 6,232,880 B1 | 5/2001 | Anderson et al. | |
| 6,581,546 B1* | 6/2003 | Dalland | A01K 15/023 119/712 |
| 7,059,275 B2 | 6/2006 | Laitinen et al. | |
| 7,409,924 B2* | 8/2008 | Kates | A01K 15/02 119/719 |
| 7,710,263 B2* | 5/2010 | Boyd | A01K 15/023 119/721 |
| 7,753,007 B1 | 7/2010 | Anderson | |
| 8,006,649 B2* | 8/2011 | Stapelfeld | A01K 15/023 119/721 |
| 8,115,642 B2 | 2/2012 | Thompson et al. | |
| 8,783,212 B2* | 7/2014 | Bellon | A01K 15/021 119/720 |
| 8,851,019 B2* | 10/2014 | Jesurum | A01K 15/023 119/721 |
| 8,955,462 B1 | 2/2015 | Golden | A01K 11/008 119/721 |
| 2002/0073933 A1* | 6/2002 | Oakman | A01K 15/023 119/721 |
| 2005/0066912 A1* | 3/2005 | Korbitz | A01K 15/023 119/721 |
| 2006/0027185 A1* | 2/2006 | Troxler | A01K 15/023 119/721 |
| 2007/0006823 A1 | 1/2007 | Sandberg | |
| 2007/0266959 A1 | 11/2007 | Brooks | |
| 2008/0236514 A1* | 10/2008 | Johnson | A01K 15/021 119/719 |
| 2008/0276879 A1* | 11/2008 | Marsh | A01K 15/023 119/719 |
| 2010/0030036 A1 | 2/2010 | Mottram et al. | |
| 2010/0302004 A1 | 12/2010 | Winstead et al. | |
| 2011/0061605 A1* | 3/2011 | Hardi | A01K 15/021 119/721 |
| 2013/0014706 A1 | 1/2013 | Menkes | |
| 2013/0192526 A1* | 8/2013 | Mainini | A01K 15/021 119/51.02 |
| 2014/0020635 A1* | 1/2014 | Sayers | A01K 15/021 119/721 |
| 2014/0230755 A1* | 8/2014 | Trenkle | A01K 27/009 119/859 |
| 2014/0320347 A1* | 10/2014 | Rochelle | A01K 15/023 342/385 |
| 2015/0053144 A1* | 2/2015 | Bianchi | A01K 15/021 119/720 |
| 2015/0075446 A1* | 3/2015 | Hu | A01K 15/022 119/718 |

\* cited by examiner

LIVESTOCK CONTROL AND MONITORING SYSTEM AND METHOD

CROSS-REFERENCE TO RELATED APPLICATIONS

This patent application claims the benefit of U.S. Provisional Patent Application No. 61/829,599, filed on May 31, 2013, which is hereby incorporated by reference herein in its entirety.

FIELD OF THE INVENTION

The present disclosure is generally directed toward systems and methods for controlling the location of, and monitoring health conditions of, livestock or other animals.

BACKGROUND OF THE INVENTION

It is known to use above-ground fences when controlling livestock or other animals to keep the animals within a desired area. These above-ground fences may take a variety of forms, such as post fences, barbed wire fences, and electrical fences which are energized with a low level electrical pulse. Further, animal control systems are known which implement buried wires, commonly known as invisible fences. These invisible fences include a transmitter which generates a coded signal that is radiated by a wire loop antenna which is buried a few inches underground and which defines an area in which the animal is to be contained or from which the animal is to be restricted. However, both of these systems involve the costly installation of a physical structure that requires maintenance, is exposed to the elements, is difficult or impossible to move, and is costly to install.

Furthermore, it is often necessary to monitor the physical conditions of livestock or other animals in order to keep the animals healthy and minimize losses among a herd. This information is difficult to gather from animals if they are not kept in a centralized location and typically involves the employ of trained professionals, such as veterinarians. Thus, there is a need for a cost effective approach to controlling and restricting the location of livestock or other animals, while also being able to monitor an animal's health and physical condition.

The present disclosure is directed toward overcoming one or more of the above-identified problems.

SUMMARY OF THE INVENTION

The present disclosure is directed toward a halter or other device worn by an animal that includes equipment for monitoring and controlling livestock location by a series of noises and vibrations, electric shock, and/or tranquilizer. All of which can be increased or decreased in intensity to achieve a desired response. Further, certain stimulus is used only in certain circumstances. For example, in a preferred embodiment a tranquilizer can be administered if animal or humans are in danger. As used herein, the terms "livestock" and "animal" means any animal whose location is desired to be controlled and/or health conditions monitored.

Monitors may include sensors that can determine the animal's location, elevation, heart rate, body temperature, how far and at what speed the animal moves, including how much the animal walks, how much and when the animal runs, how much the animal stays in one spot, etc. Vital signs, environmental conditions, and various behavioral parameters can be monitored. This may aid a user, such as a farmer, in monitoring the well-being of the herd and attending to problems quickly. For example, alerts can be generated if any of the vital signs or behavioral parameters exceeds a predetermined threshold indicative of a problem.

The systems and methods discussed herein consist of a housing that may be for example, a halter and/or collar, provided on the neck and/or over the head of an animal. In a preferred embodiment the system and method are described in use with a cow, however, as noted above, the inventive system and method may be implemented with any animal. The halter has a transceiver unit that allows the movement of the cow to be tracked remotely via GPS or other wireless tracking. Rather than using physical fences, boundary areas can be set up on a computer map and the inventive system and method tracks the movement of the cow. The system and method is able to detect when the animal is approaching the boundary of a bounded area. Noises, shocks, vibrations, etc., produced by equipment attached to, or located in, the halter are automatically activated to direct the cow away from the boundary and keep the animal in the "fenced in" area. The signals may be increased in intensity/volume until the desired response is achieved.

In a preferred embodiment, electrodes could be provided at different points on the halter to direct the animal accordingly. For example, a shock on the right side can cause the cow to move left. By tracking the animals and being able to move the animals in this manner, rotational grazing can also be effectuated without having to physically move fences or underground wires. The boundary area can move automatically to slowly move the animals from one area of a field to another area. Alternately, a farmer can move the boundary area, which can be thought of as a "fence", manually in the electronic map. A tranquilizer also may be attached to the halter and could be administered if the animal, or a human, is considered to be in danger.

The halter also has various monitoring devices on it to monitor the vital signs of a cow, as well as other parameters, such as elevation, heart rate, body temperature, the total distance an animal has traveled, how much and when an animal runs, how much the animal stays sedentary, etc. This allows the farmer to monitor the health of the herd. For example, if a cow has been stationary for a prolonged period of time, something is probably wrong. The cow is most likely either dead or injured. A notification can be sent to the farmer to check on this specific cow and the GPS will tell the farmer the location of the cow.

As disclosed herein, an apparatus for monitoring and controlling an animal comprises a housing, a transceiver attached to the housing, at least one sensor for monitoring a physiological condition of the animal, at least one stimulus device attached to the housing, and a processor in electronic communication with the receiver and the at least one stimulus device. In addition, the processor receives and stores a predetermined area in which an animal is to be confined. The predetermined area is defined by a boundary made up of a plurality of GPS coordinates.

Further, the transceiver receives at least one location signal indicating a position of an animal upon which the receiver is mounted via the housing, the processor receives the at least one location signal indicating the position of the animal from the transceiver, and the processor determines whether the animal is within a predetermined distance of the boundary of the predetermined area based upon the at least one location signal. Upon a determination that the animal is within the predetermined distance of the boundary of the predetermined area, the processor causes a stimulus to be administered to the animal via the at least one stimulus device.

In another preferred embodiment, the processor determines a trajectory of the animal based on the at least one GPS location signal, and upon a determination that the trajectory of the animal is towards the boundary of the predetermined area, the processor causes the stimulus to be administered to the animal via the at least one stimulus device such that the animal is directed away from the boundary.

In yet another preferred embodiment, the at least one stimulus device comprises at least one first stimulus device associated with a first section of the animal and at least one second stimulus device associated with a second section of the animal. Further, the least one first stimulus device and the at least one second stimulus device are configured to provide stimulus to the animal to drive the animal in a first direction or a second direction, respectively, and the processor determines a trajectory of the animal based on the at least one GPS location signal. Upon a determination that the trajectory of the animal is towards the boundary of the predetermined area in a third direction, the processor causes the stimulus to be administered to the animal via the at least one first stimulus device or the at least one second stimulus device such that the animal is directed away from the boundary of the predetermined area based on which of the first side or the second side of the animal is closest to the boundary.

In a further preferred embodiment, the housing is sized and configured to be mounted about the head of the animal.

In yet a further preferred embodiment, the at least one stimulus device is a device that emits at least one of an electric shock, a vibration, a light emission, and a sound.

In another preferred embodiment, the processor receives a signal from the at least one sensor that comprises physiological information regarding the animal.

In yet another preferred embodiment, the location signal is a Global Positioning System ("GPS") location signal.

In still another preferred embodiment, the transceiver transmits the signal from the at least one sensor such that the signal is received by a computing device that stores the physiological information regarding the animal in a database.

In a further preferred embodiment, the boundary of the predetermined area is input by a user.

In yet a further preferred embodiment, the boundary of the predetermined area changes periodically.

In still a further preferred embodiment, the apparatus further comprises a rechargeable battery attached to the housing, wherein the rechargeable battery provides power to the control system.

In another preferred embodiment, the apparatus further comprises a device for delivery of a medication.

In still another preferred embodiment, the apparatus further comprises a camera and the transceiver transmits information received by the camera.

In yet another preferred embodiment, the predetermined distance is a first predetermined distance and wherein the predetermined area is a first predetermined area. Further, the processor determines whether the animal is within a second predetermined distance of a boundary of the second predetermined area based upon the at least one location signal. The boundary of the second predetermined area is defined by a plurality of GPS coordinates and upon a determination that the animal is within the second predetermined distance of the boundary of the second predetermined area, the processor causes a stimulus to be administered to the animal via the at least one stimulus device.

In a further preferred embodiment, the boundary of the second predetermined area overlaps the boundary of the first predetermined area.

In yet a further preferred embodiment, the housing is a first housing, the transceiver is a first transceiver, the at least one stimulus device is at least one first stimulus device, the predetermined distance is a first predetermined distance, the predetermined area is a first predetermined area, the at least one location signal is a at least one first location signal, and the plurality of GPS coordinates is a first plurality of GPS coordinates, and the apparatus further comprises a second housing, a second transceiver attached to the second housing, and at least one second stimulus device attached to the second housing.

Additionally, the processor is in electronic communication with the second transceiver and the at least one second stimulus device, the second transceiver receives at least one second location signal indicating a position of a second animal upon which the second transceiver is mounted via the second housing, the processor receives the at least one second location signal indicating the position of the second animal, and the processor determines whether the second animal is within a second predetermined distance of a boundary of a second predetermined area based upon the at least one second location signal. The boundary of the second predetermined area being defined by a second plurality of GPS coordinates. Upon a determination that the second animal is within the second predetermined distance of the boundary of the second predetermined area, the processor causes a stimulus to be administered the second animal via the at least one second stimulus device.

In still a further preferred embodiment, there is a buffer area between the boundary of the first predetermined area and the boundary of the second predetermined area.

Also as disclosed herein, a method for controlling and monitoring an animal comprises receiving a plurality of GPS coordinates defining a boundary of a predetermined area in which the animal is to be confined, receiving, via a transceiver, at least one location signal indicating a position of an animal upon which the receiver is mounted via a housing, monitoring, via at least one sensor, a physiological condition of the animal and determining, via a processor in electrical communication with the transceiver, whether the animal is within a predetermined distance of a boundary of a predetermined area based upon the at least one location signal. Upon a determination that the animal is within the predetermined distance of the boundary of the predetermined area, administering a stimulus to the animal via at least one stimulus device attached to the housing.

In another preferred embodiment, the housing is a first housing, the transceiver is a first transceiver, the at least one stimulus device is at least one first stimulus device, the predetermined distance is a first predetermined distance, the predetermined area is a first predetermined area, the at least one location signal is a at least one first location signal, and the plurality of GPS coordinates is a first plurality of GPS coordinates.

In addition, the method further comprises receiving, via a second transceiver, at least one second location signal indicating a position of a second animal upon which the second transceiver is mounted via a second housing and determining, via the processor, whether the second animal is within a second predetermined distance of a boundary of a second predetermined area based upon the at least one second signal. Upon a determination that the second animal is within the second predetermined distance of the second predetermined area, administering a stimulus to the second animal via at least one second stimulus device attached to the second housing. Further, the boundary of the second predetermined area is defined by a second plurality of GPS coordinates.

Further disclosed herein an apparatus for monitoring and controlling an animal comprises a housing, a transceiver attached to the housing, a plurality of stimulus devices attached to the housing and a processor in electronic communication with the receiver and the plurality of stimulus devices. The processor receives and stores a predetermined area in which the animal is to be confined, the predetermined area being defined by a boundary made up of a plurality of GPS coordinates, the transceiver receives at least one location signal indicating a position of an animal upon which the receiver is mounted via the housing, the processor receives the at least one location signal indicating the position of the animal from the transceiver, and the processor determines a direction of movement of the animal based on the at least one location signal and determines whether the animal is within a predetermined distance of the boundary of the predetermined area. Upon a determination that the animal is within the predetermined distance of the boundary of the predetermined area, the processor selectively activates at least one stimulus device of the plurality of stimulus devices based on the determination of the direction of movement of the animal such that the animal is directed away from the boundary of the predetermined area.

It is an object of the present invention to provide a convenient means for monitoring the location of animals and keeping the animals within a restricted area.

It is a further object of the present invention to provide a convenient means for changing the restricted areas of animals without having to physically move fences.

It is yet a further object of the present invention to provide a convenient means for monitoring the vital and other signs of animals in order to quickly detect problems an animal may be having.

Further features, aspects, objects, advantages, and possible applications of the present invention will become apparent from a study of the exemplary embodiments and examples described below, in combination with the figures, and the appended claims.

BRIEF DESCRIPTION OF THE DRAWINGS

Further possible embodiments are shown in the drawings. The present invention is explained in the following in greater detail as an example, with reference to exemplary embodiments depicted in drawings. In the drawings.

DETAILED DESCRIPTION OF THE INVENTION

Figure 1:
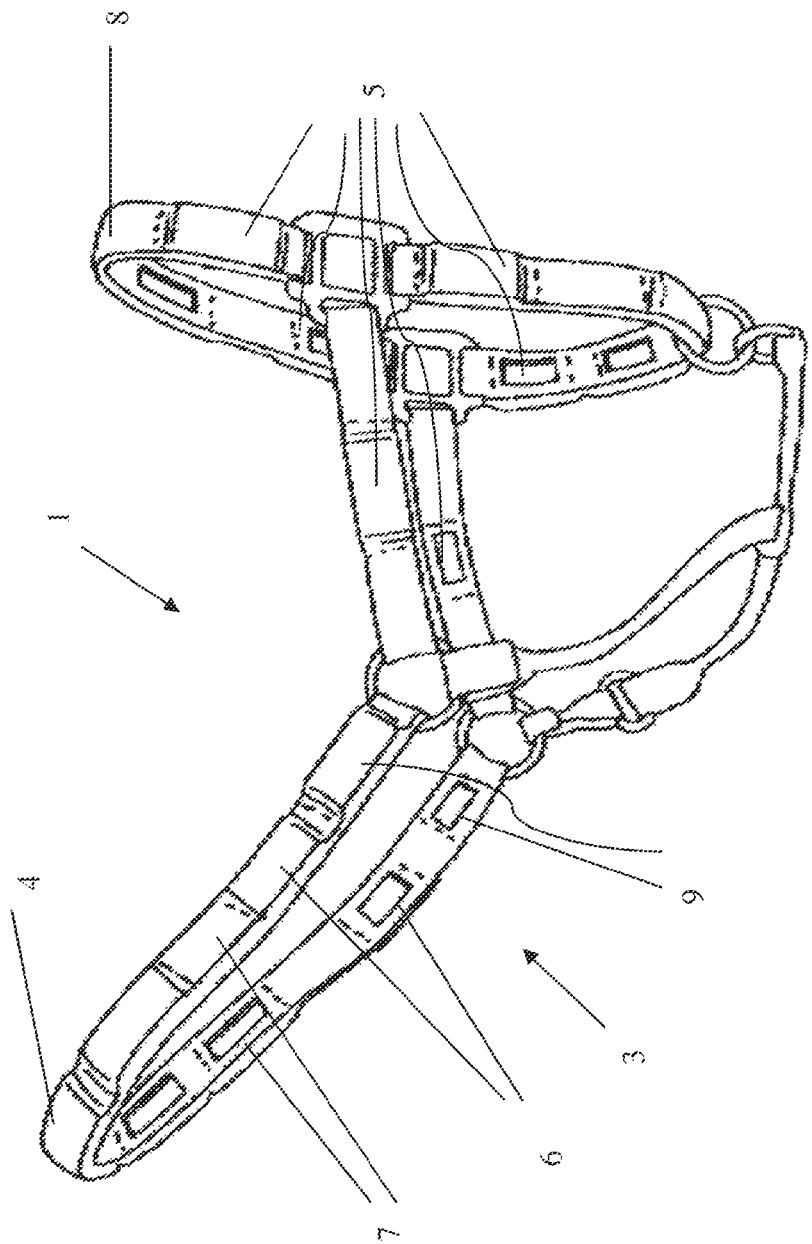
FIG. 1 is a side view of an apparatus according a preferred embodiment of the present disclosure.

Referring to FIGS. 1-7, an apparatus for monitoring and controlling an animal comprises a housing 1 and a control system 3 attached to and/or integrated with the housing 1. In a preferred embodiment shown in FIGS. 1-7, the housing is a halter 1 that fits over an animal's head (which includes the animal's nose or muzzle). In other preferred embodiments the housing may fit over all or a portion of an animal's neck, torso, or other section of the body. The housing may be configured to fit combinations thereof as appropriate. In the example shown in FIGS. 1-7, the animal is a cow and the halter fits over the neck 10 and muzzle 12 of the cow. However, the housing may be adjustable and can be designed to fit all animals including, for example, cattle, oxen, pigs, sheep, horses, deer, bison, camel, llama, alpaca, and any other animal which is desired to be monitored and their location controlled within a boundary. The housing 1 may also be designed to allow for growth of the animal and may be configured to be adjusted remotely to compensate for the size of the animal as the animal grows.

The control system 3 comprises a transmitter/receiver unit 4 and at least one stimulus device 5. The transmitter/receiver unit 4 can include a pendulum recharger, GPS tracking apparatus and a system controller. The transmitter/receiver unit 4 is configured to receive a location signal indicating a position of the animal upon which the receiver 4 is mounted via the halter 1. A processor (not shown) is configured to receive the location signal indicating the position of the animal from the transmitter/receiver 4 so that the processor is able to determine whether the animal is within a predetermined distance of a boundary (the boundary defining a predetermined area) based upon the location signal. The processor is configured to cause a stimulus to be administered to the animal via the at least one stimulus device 5 if the animal is within the predetermined distance of the boundary.

In one embodiment, the control system is constructed such that the processor is a component that attached to the housing 1 and carried with the housing 1 on the animal. In another embodiment, the processor of the control system is located remote from the housing 1. For example, the processor may be in a computing device, such as a server, that receives information regarding the location of the animal. In any case, the processor is in electronic communication with the receiver and at least one stimulus device based on a wired or wireless communication connection. Furthermore, the components of the control system as described herein may be designed and configured to be attached to and detached from the housing as a modular system. The components may also be designed and configured to fit within protective pouches located on the housing as desired.

Additionally, the severity of the stimulus administered to the animal may depend on the distance of the animal from the boundary of the predetermined area, the speed at which the animal is approaching the boundary, or other conditions. For example, the stimulus may be activated at a higher degree of severity as the animal gets closer and closer to the boundary in order to direct the animal away from the boundary. Should an animal break through the boundary, the system may continue applying stimulus until the animal is a set distance away from the boundary. At that time the stimulus can be deactivated and a warning signal can be activated indicated that an animal has escaped. Alternately, warning signals can be activated at any time as the animal approaches the boundary. The predetermined distance may also be set such that there is not a buffer from the boundary of the predetermined area (i.e.—the predetermined distance from the boundary is set to zero).

Figure 7:
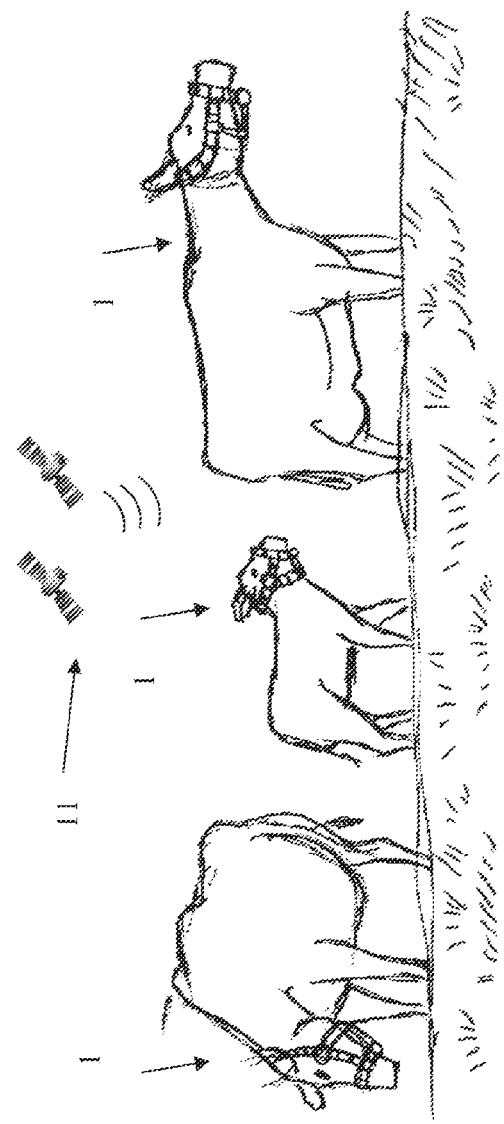
FIG. 7 is an illustration of multiple animals with the apparatus shown in FIG. 1 attached.

In a preferred embodiment, as shown in FIG. 7, the location signal indicating the position of the animal is a Global Positioning System ("GPS") location signal and the predetermined area is defined by a plurality of GPS coordinates. The GPS location signal is generated by a plurality of GPS satellites 11, which communicate with the transmitter/receiver 4 provided on the housing 1. Other navigation systems, tracking systems, or radio systems (such as mobile phone communication towers) may also be used to determine location. The system does not require a buried wire or other physical structure to be in place to define the predetermined area.

Predetermined Area

Figure 8:
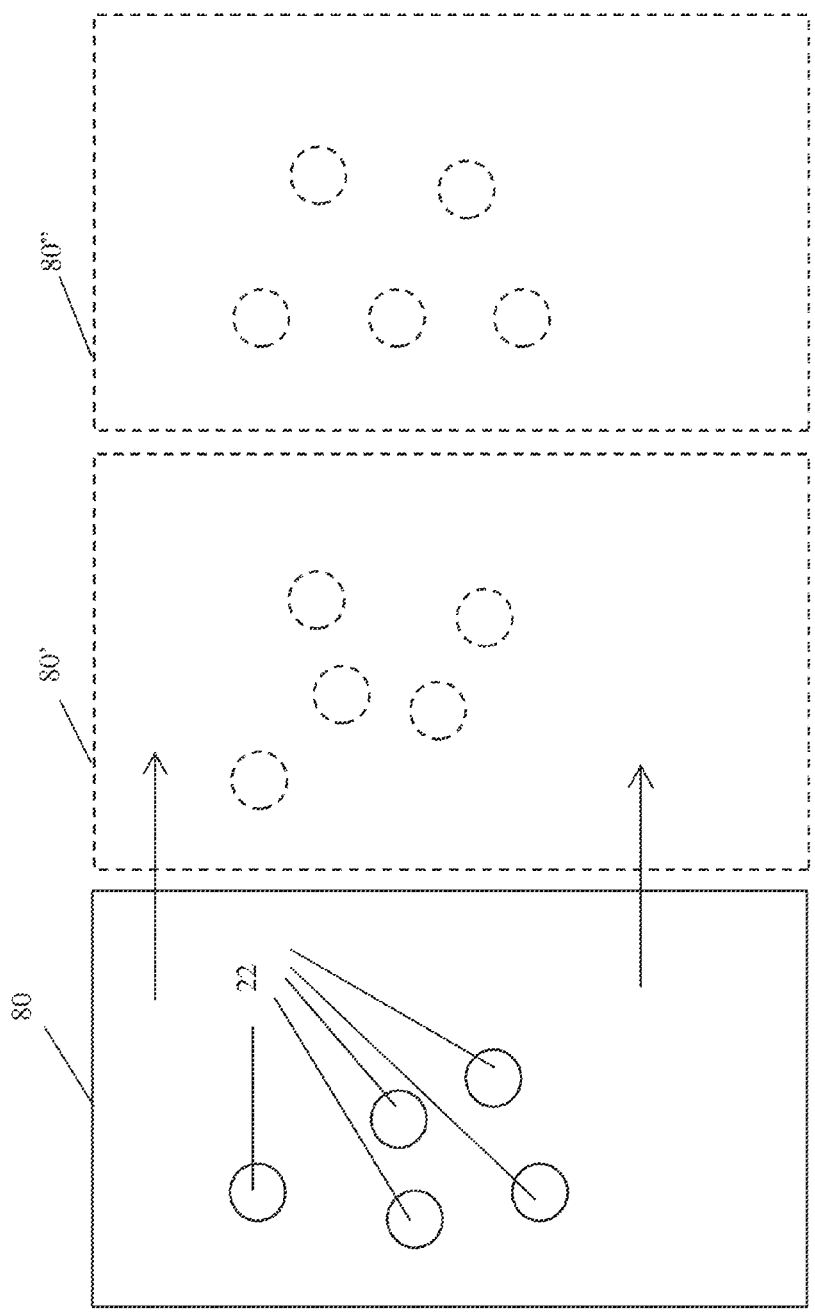
FIG. 8 depicts a predetermined area with a plurality of animals contained therein as the boundaries of the predetermined are gradually move according to a preferred embodiment of the present invention.

As shown in FIG. 8, the predetermined area is defined by a boundary 80 made up of a plurality of GPS coordinates. The boundary 80 of the predetermined area may be an area that is selected by a user or otherwise provided. The user may set the boundaries of the predetermined area by providing coordinates in a user interface that comprises a map. An interactive electronic map may be displayed on the monitor or screen of an electronic device that is used to set the boundaries of the predetermined area. The processor receives and stores the predetermined area in which the animal is to be confined.

The interactive electronic map can be implemented using an iPad, iPhone or other remote wireless device and can also be implemented via a Personal Computer ("PC"). The boundary of the predetermined area may be chosen such that it changes periodically. This provides for rotational grazing, which is when the boundaries of the predetermined area gradually moved, thus gradually moving animals 22 through an area, such as a field or pasture. As shown in FIG. 8, the animals 22 may be gradually moved from the area defined by boundary 80, to the area defined by boundary 80', and then to the area defined by boundary 80" over the course of a period of time. The movement may be preset so that it occurs automatically, or may be performed manually using the interactive electronic map.

Figure 9:
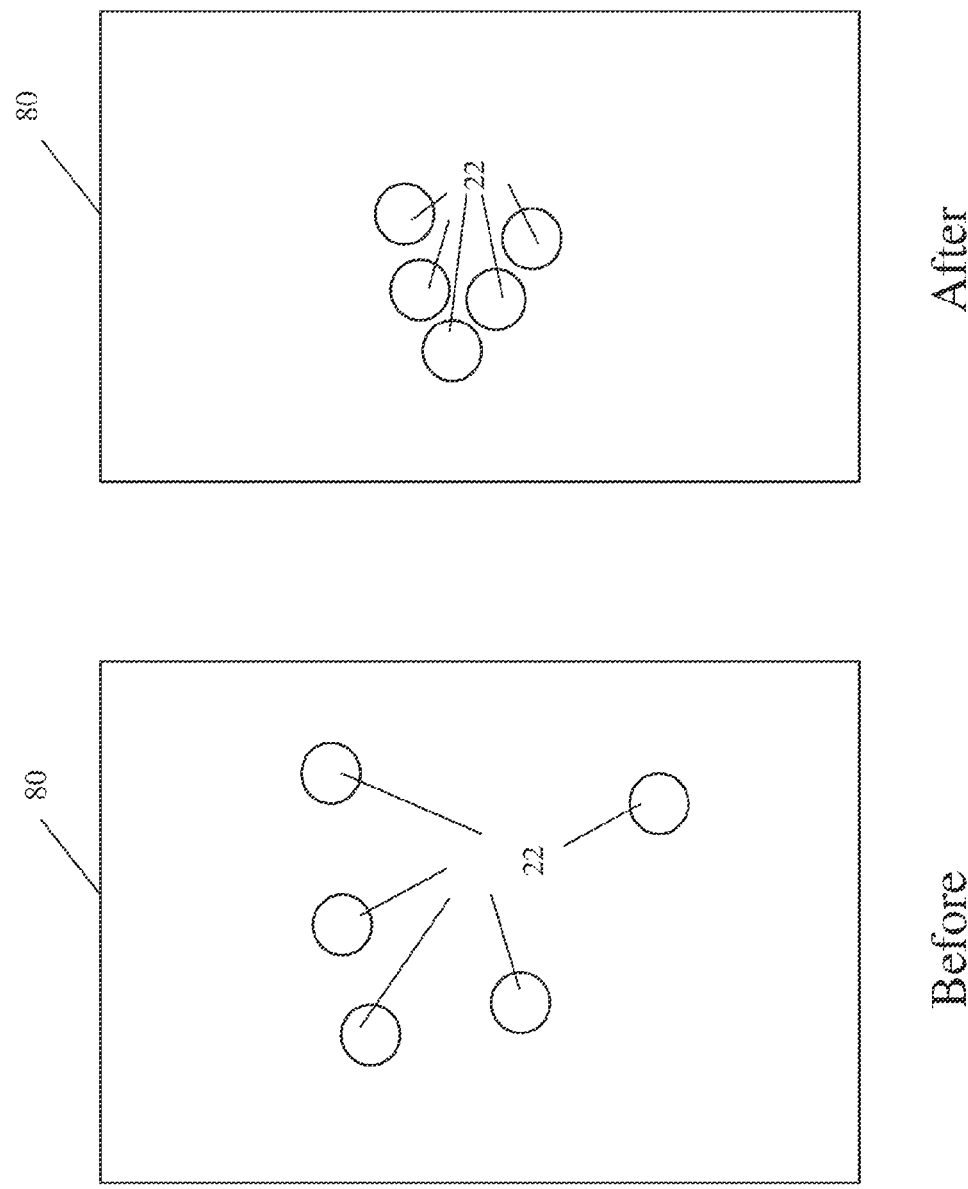
FIG. 9 depicts a plurality of animals within a predetermined area before and after the animals are herded together.

In addition, the at least one stimulus device 5 may be used to herd multiple animals into a close area within the predetermined area as shown in FIG. 9. Since the stimulus devices 5 are provided on either side of the animal 22, they may be selectively activated to direct the animal 22 in a desired direction. As shown in the "Before" and "After" views of FIG. 9, the movement of the animals 22 may be influenced via the at least one stimulus device to bring the animals 22 into a close grouping within the boundary 80 of the predetermined area.

Figure 10:
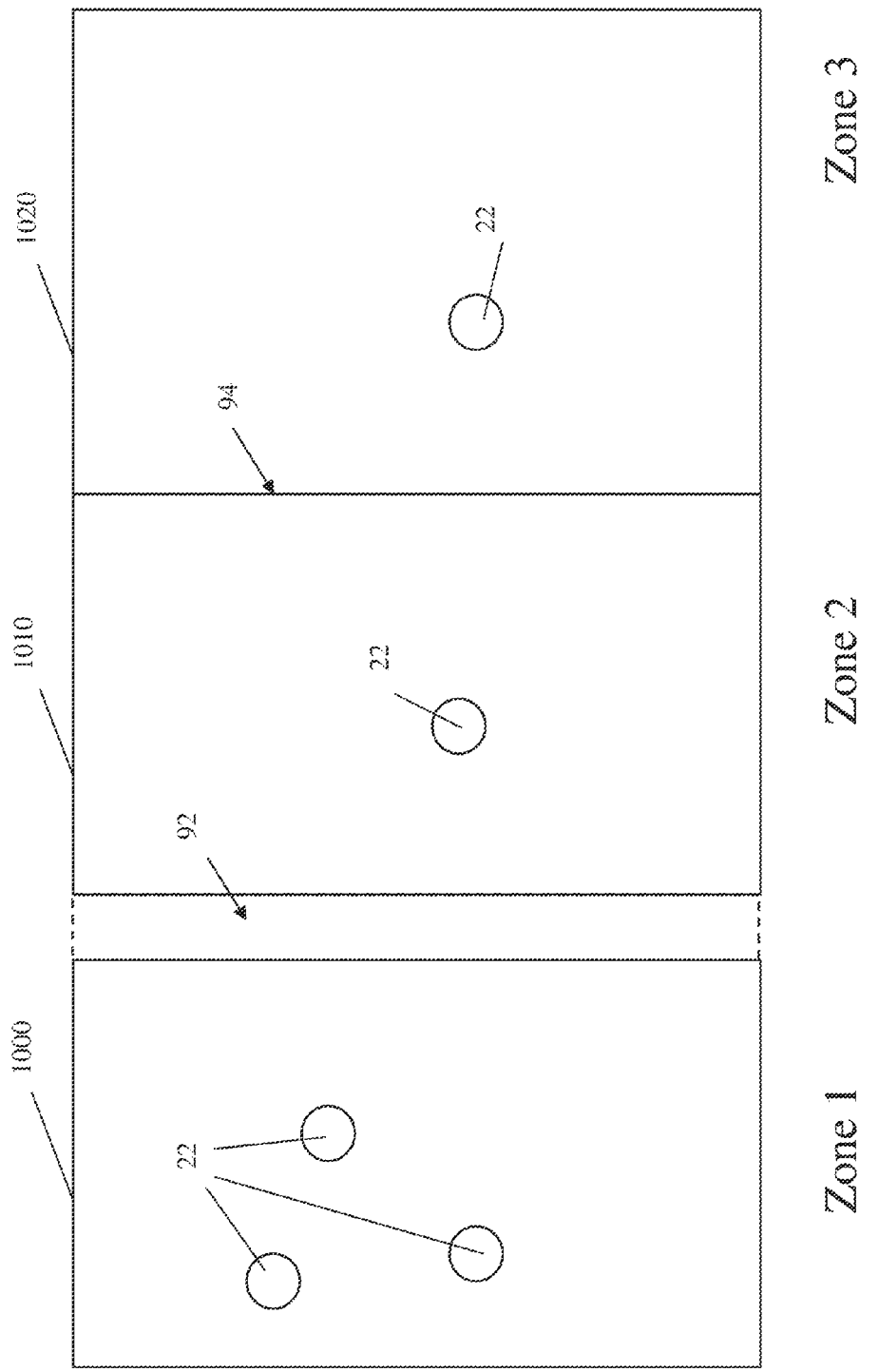
FIG. 10 depicts a plurality of predetermined areas with a plurality of animals contained therein as according to a preferred embodiment of the present invention.

Furthermore, more than one predetermined area may be desired to be set by a user. As shown in FIG. 10, a second predetermined area 1010, shown as Zone 2, may be chosen that is proximate to a first predetermined area 1000, shown as Zone 1, and the second predetermined area may have an overlap area with the first predetermined area. A third predetermined area 1020, shown as Zone 3, may also be chosen and the predetermined areas may share a common border 94 as shown with regard to Zone 2 and Zone 3. The animals 22 may be caused to be distributed within any one of the predetermined areas as desired by a user and kept therein. This has particular utility when the segregation of animals 22 is desired.

Different Animals

Figure 11:
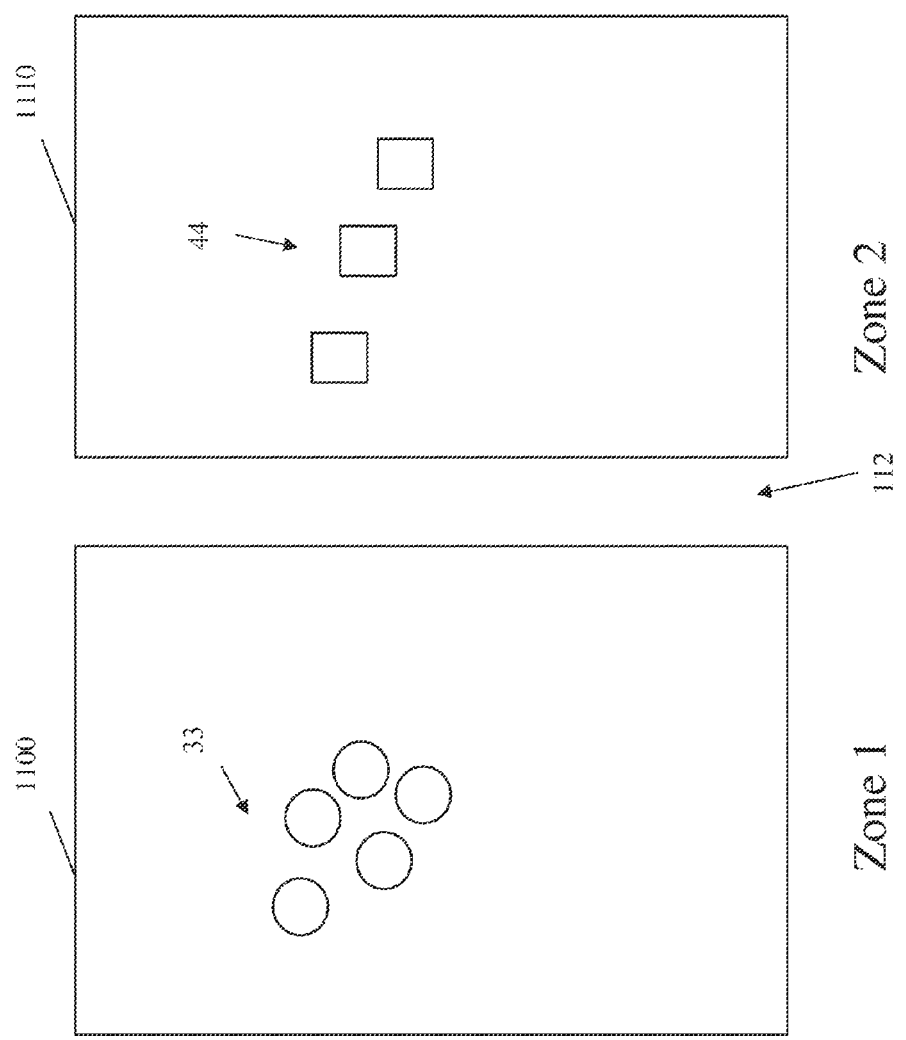
FIG. 11 depicts a plurality of predetermined areas with a plurality of animals contained in each predetermined as according to a preferred embodiment of the present invention.

The system described above may be used when controlling more than one animal, such as animals of a herd. In addition, the housing 1 and control system 3 that is attached to each animal and may comprise any or all of the functions as discussed in detail herein. As such, the system may be used to monitor and control animals of different characteristics. Animals may be kept in separate groups based on characteristics such as, for example, gender, species, or temperament. For instance, within a group of cattle, the animals may be segregated by cow, heifer, bull, steer, or any combination that is desirable. As shown in FIG. 11, a first group of animals 33 is located within a first predetermined area 1100, shown as Zone 1, and a second group of animals 44 is located within a second predetermined area 1110, shown as Zone 2. A buffer 112 may be included between the first predetermined area 1100 and the second predetermined area 1110 to prevent issues that may arise.

Stimulus

The at least one stimulus device 5 is a device that is designed to provide a stimulus that can be detected by the senses of the animal and that may elicit a reaction or response from the animal. Therefore, a stimulus device 5 may be for example, a device that provides at least one of a physical prod, an electric shock, a vibration, a light emission, and/or a sound. Regarding more specific examples, sounds may be emitted from a location on the halter 1 that is closest to an animal's ear and electronic shocks and vibrations can emit from a strap that goes over the animal's ear, nose, eye or another other place on the halter that is closest to a sensitive area on the animal. This may, for example, be based on where the animal has the least amount of hair or fur. Placement of the stimulus device 5 may also be based on locations most desirable for controlling directional movement of the animal 22.

Trajectory

The control system may also be used to move an animal in a desired direction, which may be towards or away from human beings, towards or away from other animals, and towards or away from the boundaries of the predetermined area. As an illustrative example, to keep an animal a predetermined distance away from the boundary, the processor of the control system may determine a direction of movement or trajectory of the animal based on the GPS system location. If the trajectory is towards the boundary, the processor then causes the at least one stimulus device 5 to administer a stimulus to the animal to direct the animal away from the boundary. As with the location of the animal, the trajectory may calculated based on a GPS signal or other signal provided by a navigation systems, tracking systems, or radio systems that are known to one of ordinary skill in the art.

More specifically, in a preferred embodiment the at least one stimulus device 5 comprises a plurality of stimulus devices that are position to control the directional movement of the animal. The processor determines the trajectory of the animal and if the trajectory of the animal is determined to be towards the boundary, the processor causes a stimulus to be administered to the animal via any one or more of the stimulus devices 5 in order to direct the animal away from the boundary of the predetermined area.

Figure 12:
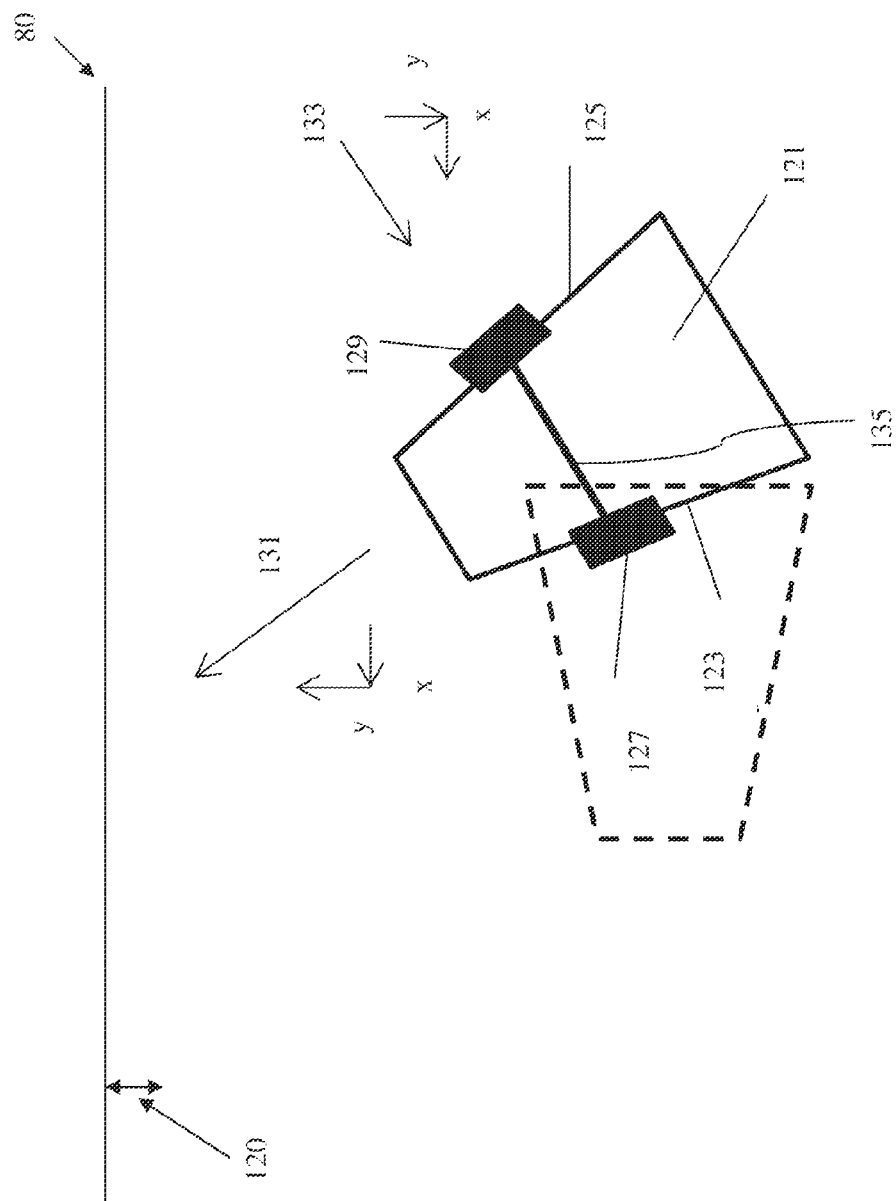
FIG. 12 depicts the movement of an animal as directed by a preferred embodiment of the present disclosure.

For example, as shown in FIG. 12, the animal's snout or muzzle is shown as 121 and the first section of the animal is the left side 123 of the animal's muzzle, and the second section 125 of the animal is the right side of the animal's muzzle, with a first stimulus device 127 and a second stimulus device 129 being held in place via the halter 135 on the left and right sides, respectively. The trajectory of the animal is shown as arrow 131 having x and y components and the direction in which the stimulus will drive the animal away from the boundary 80 of the predetermined area is shown as arrow 133, also having x and y components. By activating the second stimulus device 129 on the right side, the animal will turn left and be driven in the direction 133 and away from the boundary 80 of the predetermined area by turning its head (as shown in dotted lines).

The stimulus might not be activated until the animal is at the predetermined distance 120 from the boundary 80 of the predetermined area. Further, the severity of the stimulus administered to the animal may depend on the distance of the animal from the boundary of the predetermined area. For example, the stimulus may be activated at a higher degree of severity if the animal were in contact with the boundary 80 of the predetermined area as opposed to if where the predetermined distance 120 away from the boundary 80 of the predetermined area, when the stimulus would be activated at a low degree of severity. The stimulus can also increase in intensity as the animal gets closer and closer to the boundary. Once it is determined that the animal has turned and is heading away from the boundary, the stimulus can be lessened and deactivated.

Other stimulus devices may also added to further refine how the control system directs an animal. For instance, when a first and a second stimulus device are provided on the right and left side of the head or neck of an animal, a third and a fourth stimulus device may be provided on the right and left side of the torso of the animal. The number of stimulus devices put in use may be determinable based on the physiology of the animal to which they are attached and how best that animal reacts to a given stimulus. In addition, a predetermined distance may also be defined within a predetermined area according to the distance between two or more animals, such that the animals may be kept at predetermined distance from each other as well as away from the boundary of the predetermined area.

Vital Signs

Figure 2:
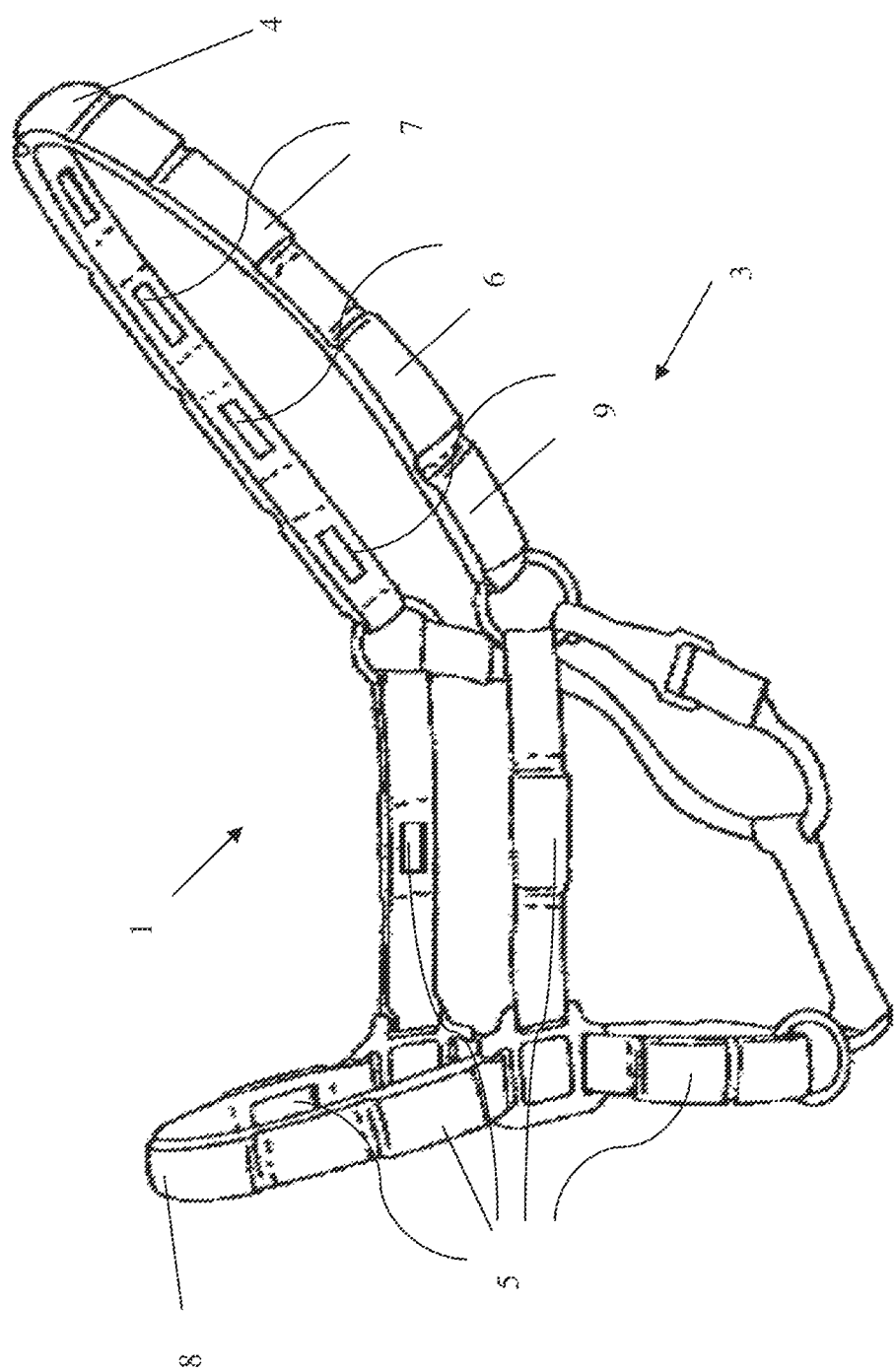
FIG. 2 is a side view of the apparatus shown in FIG. 1 that is opposite the side shown in FIG. 1.
Figure 3:
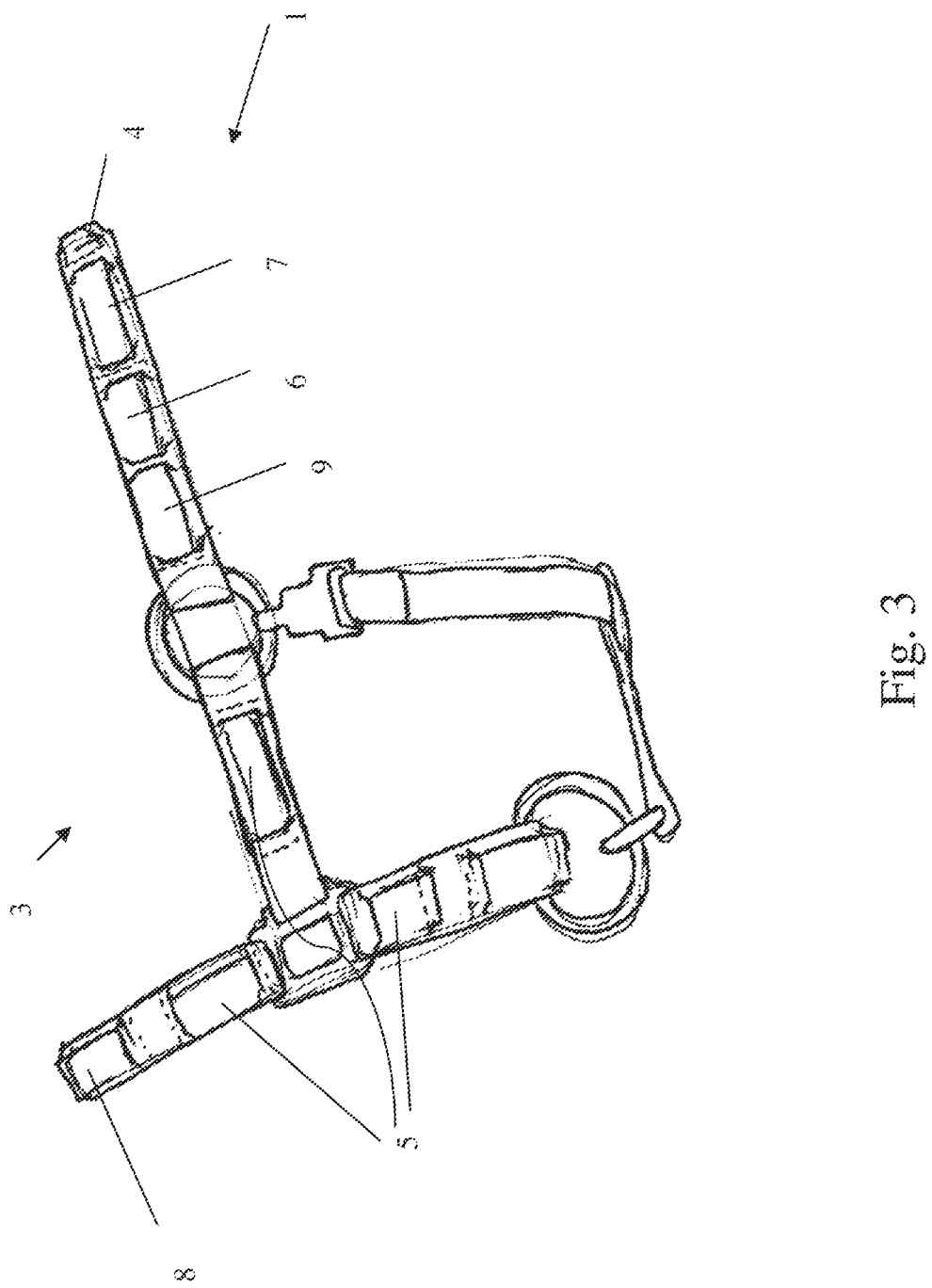
FIG. 3 is another side view of the apparatus shown in FIG. 1.
Figure 4:
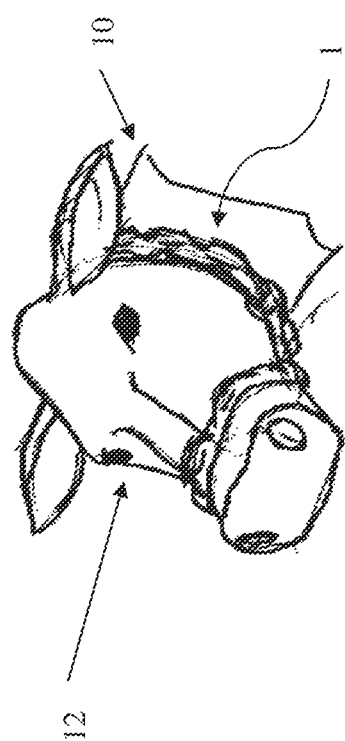
FIG. 4 is an illustration of a side view of an animal with the apparatus shown in FIG. 1 attached.
Figure 5:
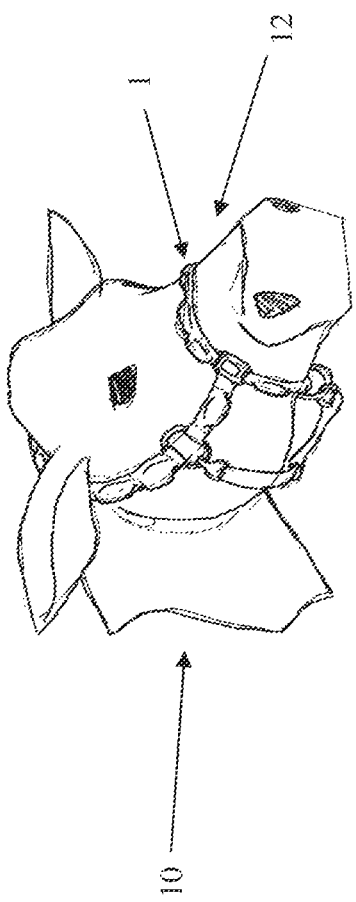
FIG. 5 is an illustration of a side view of an animal with the apparatus shown in FIG. 1 attached and is opposite the side shown in FIG. 4.
Figure 6:
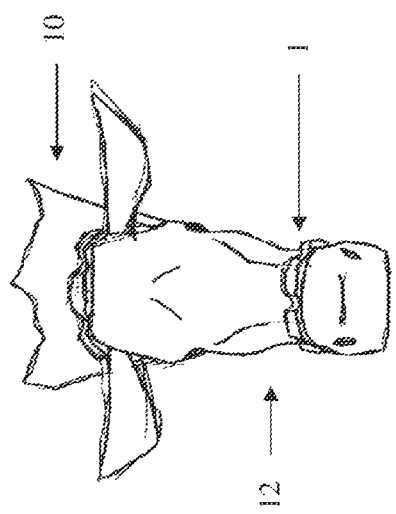
FIG. 6 is an illustration of a top view of an animal with the apparatus shown in FIG. 1 attached.

As shown in the preferred embodiment of FIGS. 1-3, the control system may also include at least one sensor 9 located on the housing 1 for monitoring physiological information of an animal. The physiological information may include for example, vital signs of the animal measured directly from the animal's body. The at least one sensor 9 may comprise a sensor(s) for measuring heart rate of the animal, blood flow of the animal, body temperature of the animal, movement of the animal (for example, a pedometer), galvanic skin response (in the case of animals that sweat), or any combination thereof. While not a sensor necessarily for a vital sign of the animal, an ambient temperature sensor may also be provided to measure the temperature of environment in which the animal is located. The at least one sensor 9 may be connected to the processor of the control system via a wired or wireless communication link.

In another preferred embodiment, the at least one sensor 9 may be located on or in the body of the animal and be proximate to the housing 1 and control system 3. Furthermore, the processor may also be configured to calculate health parameters of the animal that are not directly measured by the at least one sensor. For example, the processor may be able to calculate a period of time the animal is at rest based on movement and heart rate.

Transmitter

In a preferred embodiment, the control system comprises a transmitter/receiver. In one embodiment the receiver and transmitter may be separate components so as to avoid possible interference, however, the receiver and transmitter may be a transceiver. The use of a transmitter allows for monitoring of the location of the animal from a location that is remote from the animal and the predetermined area. Further, the transmitter allows for the processor to be located remote from the animal upon which other components of the control system are mounted.

The transmitter may transmit the location of the animal to a computer device via a wireless communication network. The location or position of the animal may also reference three dimensions, such that it includes elevation. The location of the animal may be transmitted to a computer device that implements a hardware or software program that displays a map, a chart, or otherwise provides the location of the animal. For example, the location of the animal may be tracked and displayed on a map having a grid based on GPS coordinates. The map that is displayed can be implemented via an operating program on a personal electronic device such as a personal computer, iPad, iPhone or other remote wireless device.

Further, the transmitter may be configured to transmit the physiological information about the animal received from the at least one sensor such that it can be sent and then received by a computing device that stores the physiological information in a database. Therefore, the health of an individual animal or herd of animals may be monitored remotely from the animal and the predetermined area.

The physiological information about the animal may be stored in a database such that a veterinarian would be able to access this information through a communication network. The veterinarian may be given read only access such that the information in the database could not be changed by the veterinarian.

Alerts

The apparatus may be configured to provide alerts to a user based on the physiological or position information gathered about the animal. In a preferred embodiment, an alert may be provide to let the user know specific details about the animal, such as for example, if any of the animal's vital signs or health indications are outside of a prescribed acceptable range, if the animal is running, if the animal has significantly reduced its movement, if the animal's position has not moved for a long period of time, or if the animal is spending a considerable amount of time laying down. Further, an alert may be provided to notify a user with details about the estrous cycle of the animal, so that a user knows when the animal is in heat and when is the best time to breed the animal. The alerts may allow a user, such as a farmer, to inspect the animal and take quick action to resolve any problem(s).

The alert may be displayed on the same display upon which the location of the animal or animals is displayed, which may be, for example, a map. The alert may be displayed as a popup box and/or as part of a list of alerts located within a viewing area on the map. To operate in conjunction with the alert, the housing located on the animal may have a flashing light attached to it as part of the control system. Other means for identifying the animal in the field may otherwise or additionally be present. For example, the transmitter may emit a coded radio transmission identifying a particular animal that has been determined to be injured. A user may be able to receive the coded transmission with a hand held receiver. This can provide easy and quick identification for an animal that is determined to be in distress.

Other Components

In a further preferred embodiment, the control system may include a device for delivery of a medication 6. The device may be two injection type devices, one for a first position and one for a second position of the animal. This may include, for example, a medication consisting of a tranquilizer, sedative, antibiotic, steroid, hormone, or other medicinal substance. The delivery system may be located on the halter in a position for optimum efficiency. For example, the delivery system may be positioned over a major vein or artery such that the medicinal treatment is processed quickly by the animal. Furthermore, the administration of a medication can be automatic if the system senses a problem or it can be manually activated by a user.

In another preferred embodiment, a rechargeable battery may be included to provide power to the control system. The battery may be rechargeable by solar-voltaic cells 9. Further, the battery may be charged by the movement of the animal with a device such as for example, a pendulum mechanism, and/or other means. The battery may be attached to and located on the housing in a location that best provides for charging of the battery. For example, solar-voltaic cells 9 of the battery charger may be placed on the back of the neck of the animal where it would be best exposed to sunlight. Moreover, the battery charger could be placed where it would engage in the most movement when the animal walks.

The control system may also include a camera 8 for recording real time and viewable data about the location of the animal or other animals, terrain, or other details within a proximity to the animal. The transmitter of the transmitter/receiver 4 may be configured to transmit information received by the camera 8 to a computer system and the receiver may be configured to receive control commands to operate functions of the camera. The functions of the camera 8 may include pan, zoom, rotate, night vision, thermal imaging and photography, or other desired functional aspects of a camera that may be of value to this setting.

Information Sent/Received

The receiver/transmitter 4 may be configured so that data may be sent and received by one or more communication systems, such as for example, GPS, cellular signals, and private communication towers. A central server, including at least a processor and a data storage medium, receives data regarding the animal and processes the data, thus allowing a location and physiological information about an animal to be monitored in real time. Further, multiple databases may be provided to breakdown collected information, such as location and/or vital signs, based individual animals, herds of animals, gender or type of animal, and any other classification that may be relevant as understood by one of ordinary skill in the art.

The information stored in the databases may be used by the processor to generate reports based on the collected information. The reports may be based on any of the collected information, including the information regarding the location of the animal and the physiological condition of the animal(s). For example, a report may be generated that details the specific locations of a group of animals to determine preferred grazing areas. Similarly, a report may be generated that details historical health conditions of an animal.

Tracking and Control

A system and method for monitoring and controlling livestock that comprise tracking and control functions is also discussed herein. The tracking and control functions would be configured to be administered using an iPad, iPhone, or other wired or wireless device.

Figure 13:
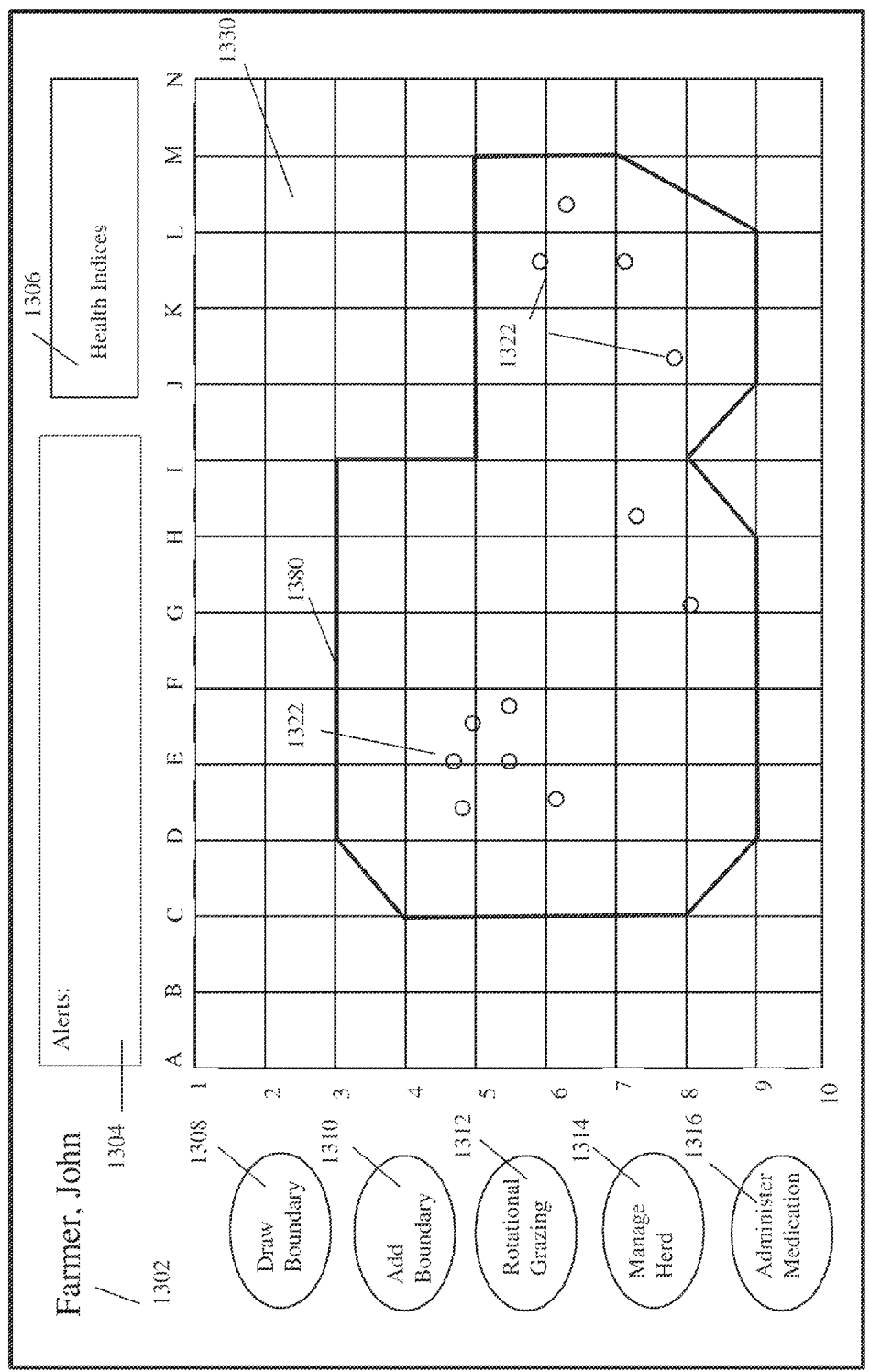
FIG. 13 is an illustration of a Graphical User Interface ("GUI") that is designed to implement the functions and operations a preferred embodiment of the present disclosure.
Figure 14:
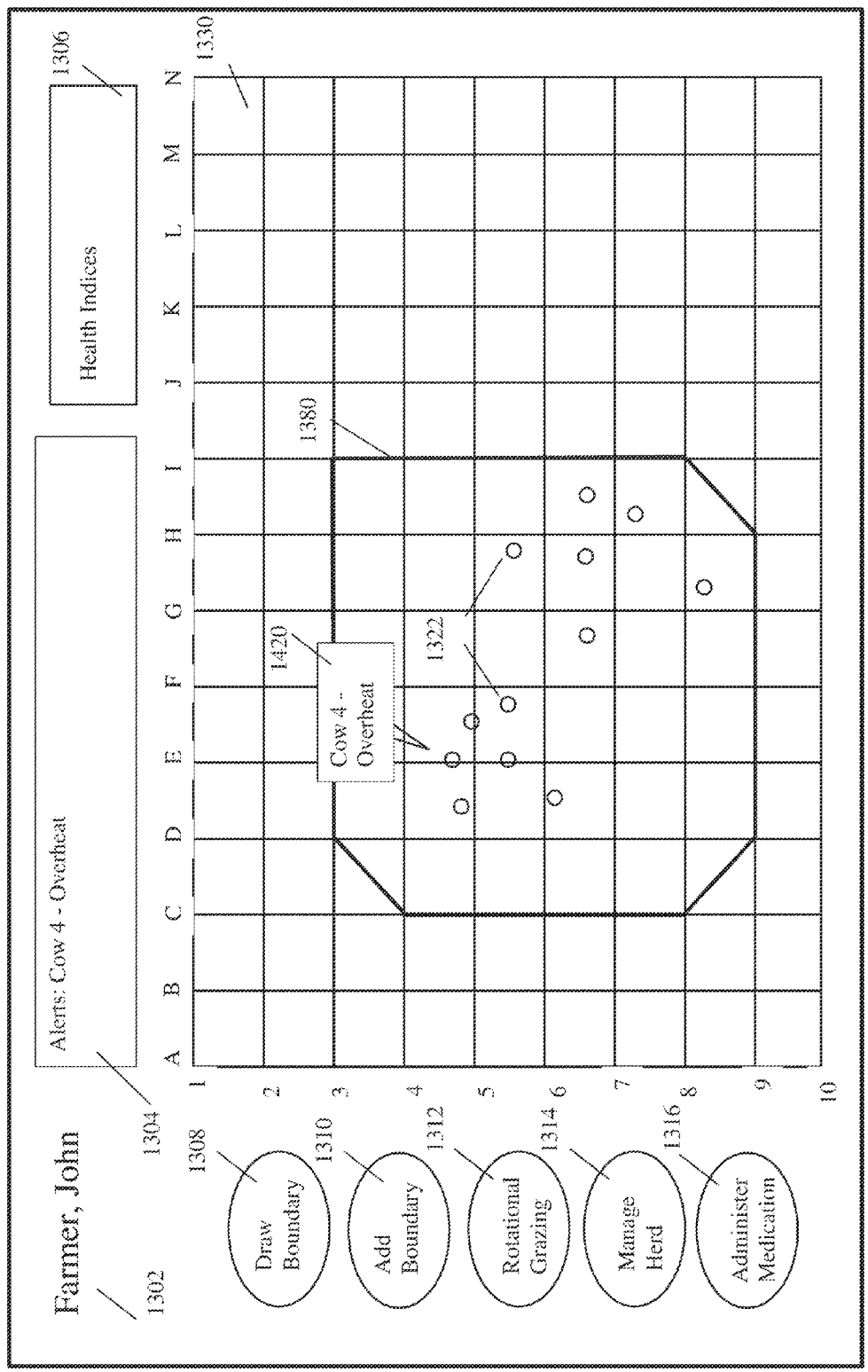
FIG. 14 is another illustration of the GUI shown in FIG. 13.
Figure 15:
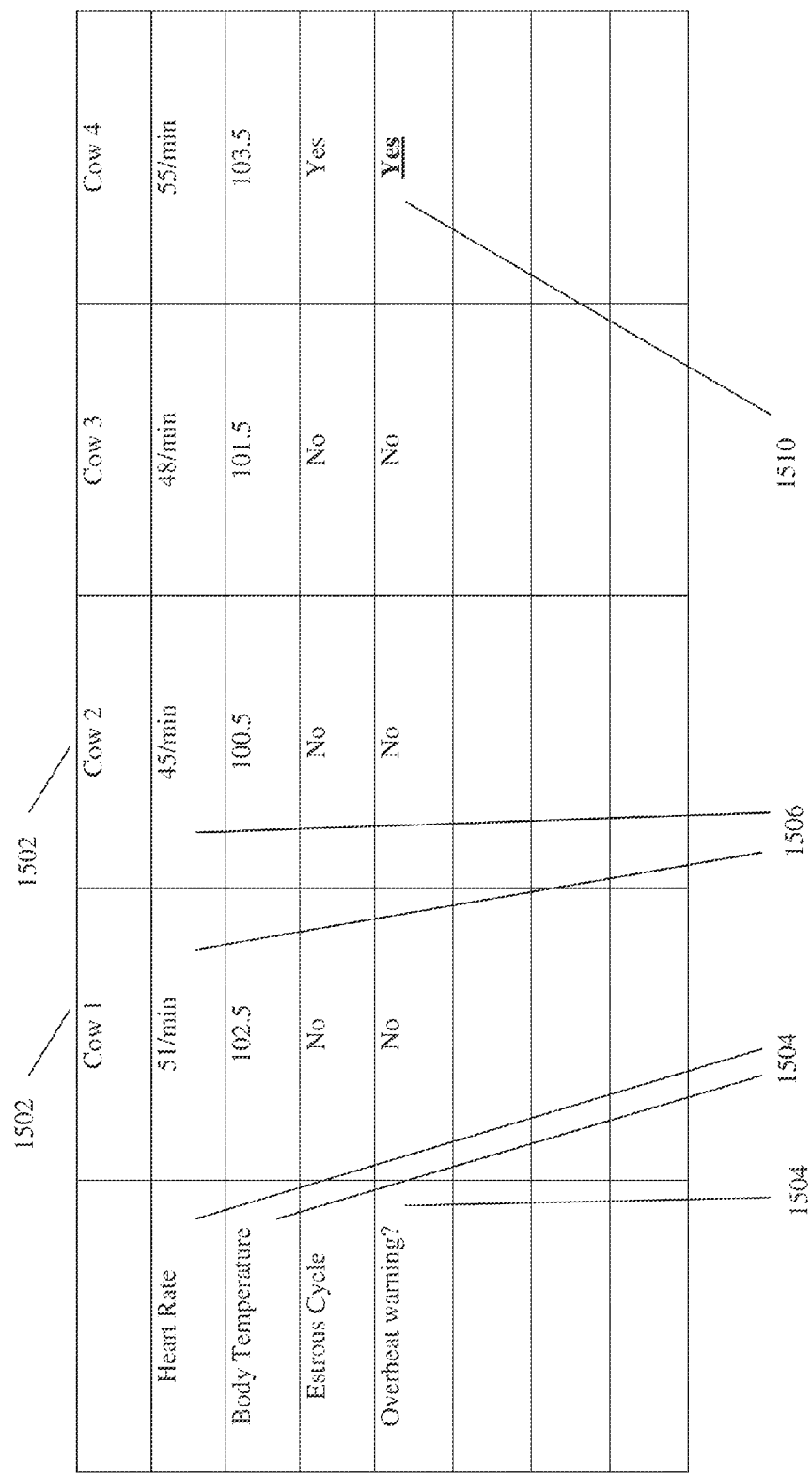
FIG. 15 is an illustration of health monitoring information associated with the GUI shown in FIG. 13.

A shown in FIGS. 13-15, a Graphical User Interface ("GUI") 1300 allows for implementation of the functions of the tracking and control functions. The GUI 1300 comprises a map area 1330 upon which the boundary 1380 of a predetermined area is laid out and the location of animals 1322 is shown. As shown in FIGS. 13-14, the map area 1330 may consist of a grid having x and y coordinates. These coordinates may conform to a GPS coordinate system, a navigation system, or any other system that would allow a user to easily set out the boundary of a predetermined location. Further, the boundary 1380 may be input manually by a user drawing it on an electronic map. This could be done, for example, by inputting grid coordinates in order to draw line segments that make up the boundary 1380. Additionally, the boundary 1380 may be displayed based on an uploaded file containing coordinates that can be drawn in the map area 1330. The uploaded file may correspond to land that own or leased by the user and the boundary 1380 may be a subsection or whole parcel as desired by the user. The boundary area 1380 may also consist of a subsection or subdivisions of the area in an uploaded file and may be chosen by a user consistent with a land use plan.

The GUI 1300 also comprises an identifier 1302 of the user, an alert field 1304, and a plurality of buttons or widgets 1308, 1310, 1312, 1314, 1316, 1306 for performing functions of the tracking and control functions. The alert field 1304 is able to display any of the information that a user would be interested in knowing about an animal as discussed above. For example, an alert may be provided to let the user know specific details about the animal, such as if any of the animal's vital signs or health indications are outside of a prescribed acceptable range, if the animal is running, if the animal has significantly reduced its movement, if the animal's position has not moved for a long period of time, or if the animal is spending a considerable amount of time laying down. Further, an alert may be provided to notify a user with details about the estrous cycle of the animal, so that a user knows when the animal is in heat and when is the best time to breed the animal. The alerts may allow a user, such as a farmer, to inspect the animal and take quick action to resolve any problem(s).

The Draw Boundary widget 1308 allows a user to create a new boundary or to erase or modifying an existing boundary. The Add Boundary widget 1310 allows a new boundary area to be created in addition to an existing boundary. The new boundary may be an area that borders, overlaps, or is exclusive of an existing boundary. The Rotational Grazing widget 1312 allows a user to set an area for rotational grazing as described above. An initial boundary area may be chosen such that it can be subdivided and a moving subdivision within the boundary area will change the area in which the animal(s) is bounded. The Manage Herd widget 1314 allows a user to group the animals within a desired space inside a boundary area or may allow a user to prescribe a range of distance for which other animals will be forced away from a chosen animal(s). The Administer Medication widget 1314 allows for a user to administer a medication to an animal that may be, for example, a tranquilizer, sedative, antibiotic, steroid, hormone, or other medicinal substance. The widgets described hereto are not intended to be limiting but merely exemplary. Other widgets, functions, commands, etc. may be provided as desired by a user in this field and as understood by one of ordinary skill in the art.

Comparing the boundary area 1380 shown in FIG. 13 and FIG. 14, the boundary area 1380 may be changed so that it is consistent with a user's land use plan. The change in the boundary area 1380 may take place based on an input from a user that causes an immediate or expedited change in the boundary area, or the change in the boundary area may take place over a predetermined period of time. Further, the change in the boundary area 1380 shown in FIG. 13 and FIG. 14 may be part of a rotational grazing plan where the change in the boundary area 1380 happens at a rate determined by a user.

The Health Indices widget 1306 allows a user to view physiological information of the animal or animals in a herd. An example of the layout of the physiological information of a group of animals is shown in FIG. 15. The physiological information may be shown for example, in text form or in a chart or graph for illustrative purposes. Further, the information may be displayed in real time or over a period of time as an average, a maximum, a minimum, or however the information would be most appropriately and effectively displayed as understood by one of ordinary skill in the art.

As shown in FIG. 15, the information of four animals, cows in this example, is shown in text form in a chart. Each column corresponds to an animal's identifier 1502 and rows correspond to physiological parameters 1504 of the animal. Rows may also correspond to alert or warning conditions 1504 regarding the health of an animal. The information for each physiological parameter 1504 is displayed under the animal's identifier 1502 accordingly. A warning or alert condition 1510 may be highlighted so that it stands out to draw the attention of a user. Furthermore, warning or alert conditions may also be displayed in the alert field 1304 and/or may be shown as a pop up box 1420 that is displayed in the map area 1330. The arrangement and display of information, for example based on the number of columns and rows, are customizable by a user based on the information that a user deems most important.

Figure 16:
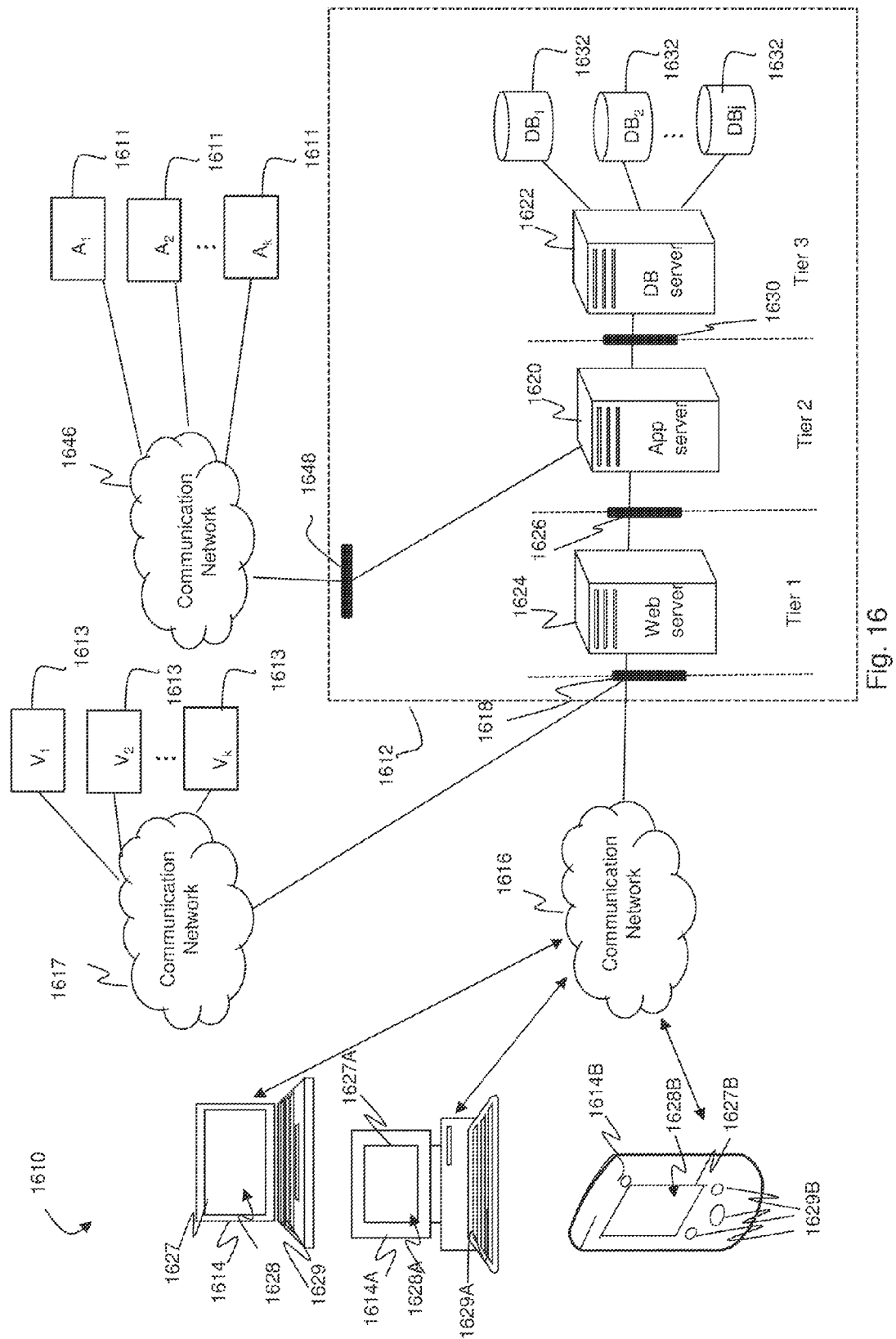
FIG. 16 is a diagram of a system that implements a preferred embodiment of the present disclosure.

FIG. 16 illustrates network architecture and components of a system for implementing the tracking and control functions. FIG. 16 illustrates a system 1610 according to embodiments of the present disclosure for providing network-based livestock monitoring and control services to user via a Graphical User Interface ("GUI") as described in FIGS. 13-15. As shown in FIG. 16, the system 1610 includes a host system 1612 in communication with one or more client devices 1614, 1614A, 1614B via a communications network 1616, in communication with one or more apparatus for tracking and monitoring livestock $A_1, A_2 \ldots A_k$ 1611 (hereinafter referred to as "apparatus 1611") via a communications network 1648, and in communication with one or more communication devices $V_1, V_2 \ldots V_k$ 1613 associated with a veterinarian (hereinafter referred to as "veterinarian devices 1613") via a communications network 1617. The communications networks 1616, 1617 and 1646 may be the Internet, although it will be appreciated that any public or private communication network, using wired or wireless channels, suitable for enabling the electronic exchange of information between one or more of the client devices 1614, 1614A, 1614B and the host system 1612 and between one or more of the apparatus 1644 and one or more of the veterinarian devices 1613 may be utilized.

The host system 1612 may be implemented by a host institution and is configured to provide network-based product and service features to a user (e.g., customers of the host institution 1612) associated with one or more of the client devices 1614, 1614A, and 1614B. The client devices 1614, 1614A, 1614B may include any form of mobile or portable device and any suitable network-enabled devices such as, for example, PCs, laptop computers, palmtop computers, mobile phones, mobile tablets, PDAs, etc. configured to transmit and receive information via the communications network 1316 using wired or wireless connections.

The client devices 1614, 1614A, 1614B are capable of receiving user input via an input device. According to embodiments, the input device may be one or more of a touch-sensitive display such as a touch screen interface, a keyboard, a microphone, or a pointing device such as a mouse or stylus. Client devices 1614, 1614A, 1614B also include a display device (see display devices 1627, 1627A, 1627B of FIG. 16 and display 1730 of FIG. 17) capable of rendering an interactive GUI, such as that discussed with reference to FIGS. 13-15.

The input devices 1629, 1629A, 1629B allow a user to interact with the GUI described with reference to FIGS. 13-15 to instruct the system 1610 and computer 1700 discussed herein with respect to FIGS. 16 and 17, respectively, to display and edit boundary area and livestock physiological information, along with related details, which are then rendered in the display device. For example, the interactive interface for the GUI described with reference to FIGS. 13-15 can be rendered in a User Interface ("UI") 1628, 1628A, 1628B of one of the client devices 1614, 1614A, 1614B via one of the display devices 1628, 1628A, 1628B, respectively. Alternatively, the GUI of FIGS. 13-15 can be rendered on a display device of one or more servers, such as the web server 1624, application server 1620, and database server 1622 shown in FIG. 16.

In exemplary embodiments, client devices 1614, 1614A, 1614B can be, but are not limited to, a personal computer (PC), a Personal Digital Assistant (PDA), a tablet computing device, an iPhone™, an iPod™, an iPad™, a device operating the Android operating system (OS) from Google Inc., a device running the Microsoft Windows® Mobile OS, a device running the Microsoft Windows® Phone OS, a device running the Symbian OS, a device running the webOS from Hewlett Packard, Inc., a mobile phone, a BlackBerry® device, a smartphone, a hand held computer, a netbook computer, a palmtop computer, a laptop computer, an ultra-mobile PC, a portable gaming system, or another similar type of mobile computing device having a capability to communicate via the communications network 1616.

Certain embodiments of the client devices 1614, 1614A, 1614B depicted in FIG. 16 are described in more detail below.

In some embodiments, the host system 1612 may be based on a multi-tiered network architecture, and includes a web server 1624 (Tier 1), an application server 1620 (Tier 2), and a database server 1622 (Tier 3). The servers 1624, 1620, and 1622 can be any type of server or computing device capable of serving data from a database to one or more of the client devices 1614, 1614A, 1614B. For example, the servers 1624, 1620, 1622 can include, but are not limited to, a computer or a cluster of computers that may be a part of a server farm. While not pictured, the functions of each server 1624, 1620, 1622 may integrated into a one or more individual servers.

The web server 1624 corresponds to the first tier of the host system 1612 and is configured to communicate with the communication network 1616 via a border firewall 1618, and with the application server 1620 via an application firewall 1626. The web server 1624 may be configured to accept information requests, such as, for example, HTTP requests, from one or more of the client devices 1614, 1614A, 1614B via the communication network 1616 and provides responses thereto. The responses may include, for example, HTTP responses including static and/or dynamic HTML documents for providing a UI to users via the client devices 1614, 1614A, and 1614B. Additionally, the web server 1624 may further be configured to authenticate a user before allowing access to the GUI discussed in regards to FIGS. 13-15 and other resources associated with the host system 1612. Authentication may be performed, for example, by the user inputting a user name and a password.

The application server 1620 corresponds to the second tier of the host system 1612 and is configured to communicate with the web server 1624 via the application firewall 1626, and with the database server 1622 via an internal firewall 1630. The application server 1622 may host one or more applications executing logic to provide livestock monitoring and control service features to each user via a UI on a respective one of the client devices 1614, 1614A, 1614B. The application server 1630 may receive user-entered information (e.g., a user name and password associated with the user to access particular features, commands to define a new boundary area or administer medication) from the UI 1628, 1628A, 1628B of a client device 1614, 1614A, and 1614B via the web server 1624.

Based on this and other information received from one or more of the client devices 1614, 1614A, 1614B, applications hosted by the application server 1620 may be invoked to perform control and monitoring functions implemented by the tracking and control application (e.g., change a boundary area, retrieve livestock health information, administer medication, create new user accounts, etc.) and generate corresponding informational content (e.g., livestock location and health reports, livestock alert reports, confirmation of medication administration, user account confirmation information, etc.). Information regarding such control and monitoring functions may be communicated to the web server 1624 and subsequently presented to the users using, for example, a dynamic web page of a UI 1628, 1628A, 1628B. Additionally, the application server 1620 may also host an application for enabling users to conduct email communication with the host institution 1612 and/or other parties, such as information technology support, veterinarians associated with veterinarian devices 1613, or emergency crews.

The database server 1622 corresponds to the third tier of the host system 1612 and is configured to communicate with the application server 1620 via the internal firewall 1630. The database server 1622 manages one or more databases $DB_1, DB_2 \ldots DB_i$ 1632 (hereinafter referred to as "databases 1632") which store data to support one or more applications hosted by the application server 1620 or elsewhere. Such databases may include, for example, user account information databases, livestock information databases, user preferences/settings databases, as well as databases for storing other settings and/or configuration data for the application. Database information requested by a particular application is retrieved from the databases 1632 by the database server 1622, communicated to the requesting application, and updated by the database server 1622 as needed.

The client devices 1314, 1314A, 1314B, as discussed above, may be PCs and/or other network-enabled devices (e.g., cell phones, mobile phones, mobile tablets, PDAs, etc.) configured to transmit and receive information via the communication network 1616 using a wired or wireless connection. The client devices 1614, 1614A, 1614B may include a suitable browser software application (e.g., Internet Explorer, Internet Explorer Mobile, Firefox, Blazer, etc.) for enabling the user to display and interact with information exchanged via the communication network 1616. The client devices 1614, 1614A, 1614B may thus access and navigate static and/or dynamic HTML documents of a respective UI 1628, 1628A, 1628B.

The display devices 1627, 1627A, 1627B of each of the client devices 1614, 1614A, and 1614B can differ depending on the type of computing device used as a particular client device. For example, a display device 1628A of a tablet device, netbook, or laptop such as client device 1614A is typically an integrated LCD screen, which is often smaller than a monitor or console such as the display device 1628 for a workstation or desktop PC such as client device 1614. Similarly, the display device 1628B of a mobile computing device such as client 1614B may be a relatively small display such as mobile phone display.

The input devices 1629, 1629A, 1629B can also vary depending on the characteristics of a particular client device and its display device. For example, the input device 1629A of a tablet, netbook, or laptop client device 1614A may include a relatively small physical or touchscreen keyboard, an integrated camera, track pad, and/or microphone, while the input device 1629 of a desktop PC or workstation client such as client device 1614 will typically include a physical QWERTY or Dvorak keyboard and a mouse. Also, for example, an input device 1629B of a mobile client 1614B will typically lack a full physical keyboard and may instead comprise one or more of a touch-screen keyboard, a microphone, an integrated camera, a track pad, a scroll wheel, a track ball, a T9 keyboard, a button, and a touch screen display device 1628B. In embodiments, any of the display devices 1627, 1627A, and 1627B can be a touch screen display. It is to be understood that in the case of a touch screen interface, the input device can be anything capable of interacting with the touch screen, including a user's fingers, which can be used to select, slide, drag, and resize (i.e., expand, maximize, shrink, and/or minimize) interactive UI elements through pointing, pinching, and scrolling gestures.

In accordance with certain preferred embodiments, the UI 1628, 1628A, 1628B can be tailored to or customized for a particular client device 1614, 1614A, 1614B based on the capabilities of the platform used by that client device. The platform comprises physical capabilities of the client device such as, memory capacity in terms of random access memory (RAM) and read only memory (ROM), central processing unit (CPU) capabilities in terms of clock speed and available processing capacity, available storage in terms of disk space or flash memory, communications capabilities in terms of current wired and/or wireless network connectivity and a communications interface such as a network interface card (NIC) of the computing device, capabilities of the display device 1627, 1627A, 1627B, and capabilities of the input device 1629, 1629A, 1629B. These physical capabilities and others can be determined based on a manufacturer, model number, serial number, a Media Access Control address (MAC address) and/or another unique identifier of a computing device used as a client device.

The platform of a client device also comprises software and firmware components, such as an operating system (OS) running on the client device, Internet browser(s), native software applications installed, and privileges/permissions associated with the client device. The privileges/permissions may be controlled by the host system 1612 based on a user and/or an entity associated with the client device 1614, 1614A, 1614B and can include data access, communications, and application execution privileges.

According to embodiments, the UI 1628B for mobile clients 1614B may be rendered as streamlined, "mobile friendly", versions of a "full" UI for ease of use on relatively small display devices 1627B. In embodiments, mobile friendly UI 1628B may have reduced capabilities and/or display a lesser level of detail as compared to a full UI, such as for example 1628. A mobile friendly UI 1628B can also be tailored to accept input from input devices 1629B for a specific platform of a mobile client device 1614B. The mobile friendly UI 1628B can be automatically selected by the system 1610 in response to detecting one or more platform characteristics of a particular mobile client device 1614B. Alternatively, a user of a mobile client device 1614B can be prompted within a full UI to opt-in to using the mobile friendly UI 1628B in response to detecting that the client device 1614B is accessing the host system 1612 is a mobile computing device. In cases where a user's client device has a display device and input device capable of using the full UI, the user may not wish to use the mobile friendly UI.

According to certain preferred embodiments, such as that depicted in FIGS. 13-15, the UI 1628 may allow tracking and control operations to be performed and displayed with a greater level of detail than a mobile friendly UI 1628B. For example, the granularity of editing and scheduling boundary area changes may be finer (i.e., more detailed) in the full UI 1628 as compared to the mobile friendly UI 1628B.

The veterinarian devices 1613 may have all the same characteristics, functions, and be able to conduct the same operations as the client devices 1614, 1614A, 1614B that are discussed above. In a preferred embodiment, a veterinarian may be given read only access through a device 1613 such that the information in a display or database could not be changed by the veterinarian. Further, a veterinarian may be given limited control over defining or changing a boundary or monitoring function and given further access through permissions granted by a user.

The one or more of the communications networks 1616, 1617 and 1646 can be any network or combination of networks that can carry data communications. Such networks can include, but are not limited to, wireless data networks such as a Wi-Fi, 3G, and a 4G/LTE network. In addition, the communications networks 1616 and 1646 shown in FIG. 16 can include, but are not limited to a wired Ethernet network, a local area network (LAN), a medium area network, and/or a wide area network (WAN) such as the Internet. In exemplary implementations of system 1610 including wireless networks, one or more of the communications networks 1616 and 1646 can support protocols and technology including, but not limited to, Internet or World Wide Web protocols and/or services. Intermediate network routers, gateways, or servers (not shown) may be provided between or as part of the components of the communication network architecture employed by communication networks 1616, 1617, and 1646, the client devices 1614, 1614A, 1614B, the veterinarian devices 1613, the one or more apparatus 1611, and the host system 1612 depending upon a particular application or environment.

Example Computer System Implementation

Embodiments of the tracking and control functions for monitoring and controlling livestock also may be directed to computer program products comprising software stored on any computer useable medium. Such software, when executed in one or more data processing device, causes a data processing device(s) to operate as described herein. Embodiments of the present disclosure employ any computer useable or readable medium. Examples of computer useable mediums include, but are not limited to, primary storage devices (e.g., any type of random access memory), secondary storage devices (e.g., hard drives, floppy disks, CD ROMs, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

Accordingly, it will be appreciated that one or more embodiments of the present disclosure can include a computer program comprising computer program code means adapted to perform one or all of the steps of any methods or claims set forth herein when such program is run on a computer, and that such program may be embodied on a computer readable medium. Further, one or more embodiments of the present disclosure can include a computer comprising code adapted to cause the computer to carry out one or more steps of methods or claims set forth herein, together with one or more apparatus elements or features as depicted and described herein.

As would be appreciated by someone skilled in the relevant art(s) and described below with reference to FIG. 17, part or all of one or more aspects of the methods, systems, and apparatus discussed herein may be distributed as an article of manufacture that itself comprises a computer readable medium having computer readable code means embodied thereon.

The computer readable program code means is operable, in conjunction with a computer system, to carry out all or some of the steps to perform the methods or create the apparatuses discussed herein. The computer readable medium may be a recordable medium (e.g., hard drives, compact disks, EEPROMs, or memory cards). Any tangible medium known or developed that can store information suitable for use with a computer system may be used. The computer-readable code means is any mechanism for allowing a computer to read instructions and data, such as magnetic variations on a magnetic media or optical characteristic variations on the surface of a compact disk. The medium can be distributed on multiple physical devices (or over multiple networks). For example, one device could be a physical memory media associated with a terminal and another device could be a physical memory media associated with a processing center.

The computer systems and servers described herein each contain a memory that will configure associated processors to implement the methods, steps, and functions disclosed herein. Such methods, steps, and functions can be carried out, e.g., by processing capability on mobile device, POS terminal, payment processor, acquirer, issuer, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor.

Aspects of the present disclosure shown in FIGS. 1-16, or part(s) or function(s) thereof, may be implemented using hardware, software modules, firmware, tangible computer readable media having instructions stored thereon, or a combination thereof and may be implemented in one or more computer systems or other processing systems.

Figure 17:
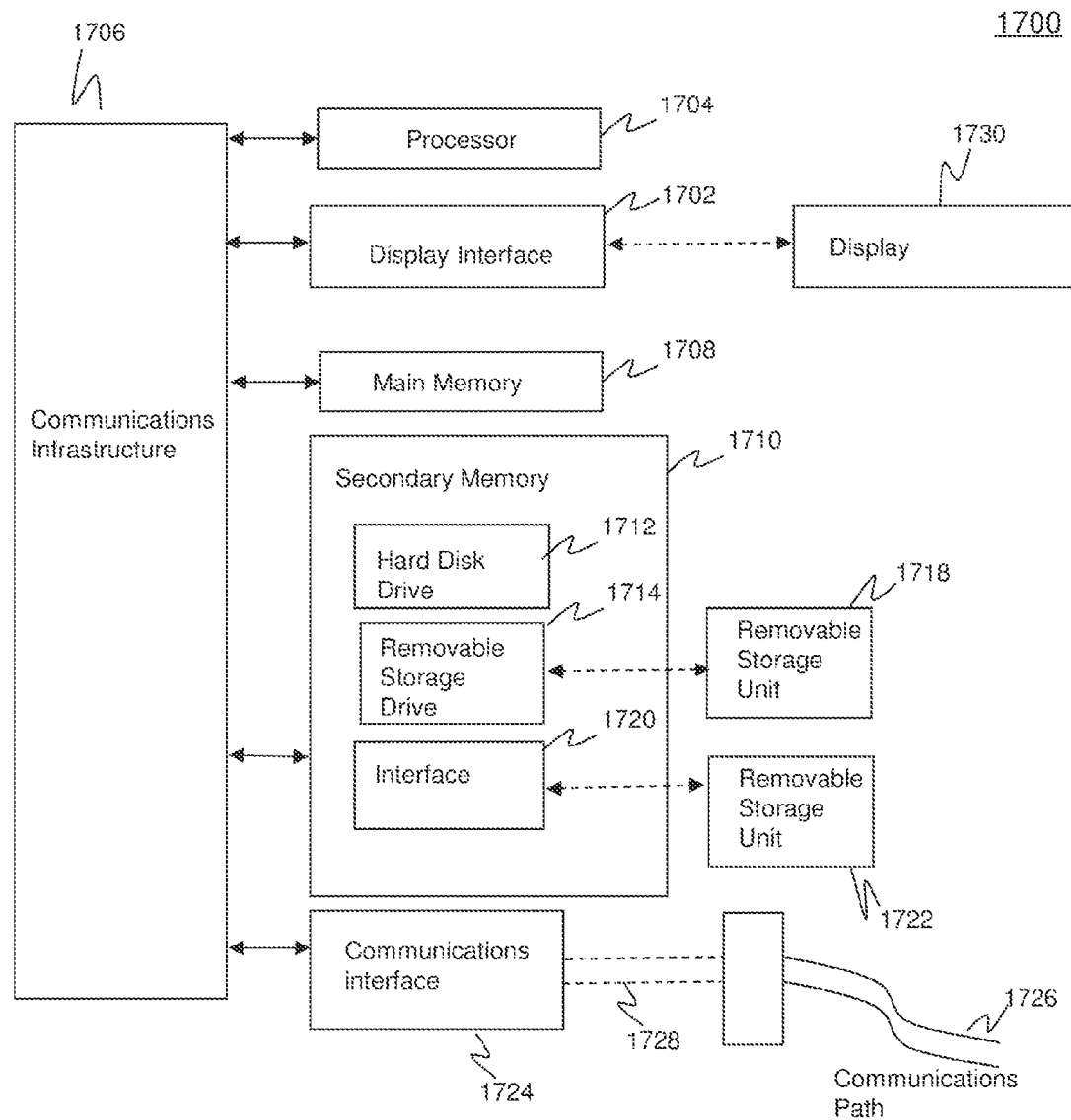
FIG. 17 is a component diagram of a computer device that implements a preferred embodiment of the present disclosure.

FIG. 17 illustrates an example computer system 1700 in which embodiments of the present disclosure, or portions thereof, may be implemented as computer-readable code. For example, the various aspects of the GUI depicted in FIGS. 13-15 can be implemented in computer system 1700 using hardware, software, firmware, non-transitory computer readable media having instructions stored thereon, or a combination thereof and may be implemented in one or more computer systems or other processing systems. Hardware, software, or any combination of such may embody any of the modules and components used to implement the network architecture and system 1710 shown in FIG. 17, methods described above, and the GUI described above with reference to FIGS. 13-15. Furthermore, anyone of the servers 1624, 1620, and 1622 may embody the computer system 1700.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments. A processor device may be a single processor, a plurality of processors, or combinations thereof. Processor devices may have one or more processor "cores."

Various embodiments of the present disclosure are described in terms of this example computer system 1700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

The processor device 1704 may be a special purpose or a general purpose processor device. As will be appreciated by persons skilled in the relevant art, processor device 1704 may also be a single processor in a multi-core/multiprocessor system, such system operating alone, or in a cluster of computing devices operating in a cluster or server farm. Processor device 1704 is connected to a communication infrastructure 1606, for example, a bus, message queue, network, or multi-core message-passing scheme.

The computer system 1700 also includes a main memory 1708, for example, random access memory (RAM), and may also include a secondary memory 1710. Secondary memory 1710 may include, for example, a hard disk drive 1742, removable storage drive 1714. Removable storage drive 1714 may comprise a floppy disk drive, a magnetic tape drive, an optical disk drive, a flash memory, or the like.

The removable storage drive 1714 may read from and/or writes to a removable storage unit 1718 in a well-known manner. The removable storage unit 1718 may comprise a floppy disk, magnetic tape, optical disk, Universal Serial Bus (USB) drive, flash drive, memory stick, etc. which is read by and written to by removable storage drive 1714. As will be appreciated by persons skilled in the relevant art, the removable storage unit 1718 includes a non-transitory computer usable storage medium having stored therein computer software and/or data.

In alternative implementations, the secondary memory 1710 may include other similar means for allowing computer programs or other instructions to be loaded into computer system 1700. Such means may include, for example, a removable storage unit 1722 and an interface 1720. Examples of such means may include a program cartridge and cartridge interface (such as that found in video game devices), a removable memory chip (such as an EPROM, or PROM) and associated socket, and other removable storage units 1722 and interfaces 1720 which allow software and data to be transferred from the removable storage unit 1722 to computer system 1700.

The computer system 1700 may also include a communications interface 1724. The communications interface 1724 allows software and data to be transferred between the computer system 1700 and external devices. The communications interface 1724 may include a modem, a network interface (such as an Ethernet card), a communications port, a PCMCIA slot and card, or the like. Software and data transferred via the communications interface 1724 may be in the form of signals, which may be electronic, electromagnetic, optical, or other signals capable of being received by communications interface 1724. These signals may be provided to the communications interface 1724 via a communications path 1726. The communications path 1726 carries signals and may be implemented using wire or cable, fiber optics, a phone line, a cellular/wireless phone link, an RF link or other communications channels.

In this document, the terms "computer program medium", "non-transitory computer readable medium", and "computer usable medium", are used to generally refer to tangible media such as removable storage unit 1718, removable storage unit 1722, and a hard disk installed in hard disk drive 1712. Signals carried over the communications path 1726 can also embody the logic described herein. The computer program medium and computer usable medium can also refer to memories, such as main memory 1708 and secondary memory 1710, which can be memory semiconductors (e.g. DRAMs, etc.). These computer program products are means for providing software to computer system 1700.

Computer programs (also called computer control logic and software) are generally stored in a main memory 1708 and/or secondary memory 1710. The computer programs may also be received via a communications interface 1724. Such computer programs, when executed, enable computer system 1700 to become a specific purpose computer able to implement the present disclosure as discussed herein. In particular, the computer programs, when executed, enable the processor device 1704 to implement the processes of the present disclosure discussed below. Accordingly, such computer programs represent controllers of the computer system 1700. Where the present disclosure is implemented using software, the software may be stored in a computer program product and loaded into the computer system 1700 using the removable storage drive 1714, interface 1720, and hard disk drive 1712, or communications interface 1724.

The exemplary embodiments of the present invention are not limited to the above-described examples and emphasized aspects but, rather, may appear in a large number of modifications that lie within the scope of handling by a person skilled in the art.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range.

The invention claimed is:

1. An apparatus for monitoring and controlling an animal comprising:
    a housing;
    a transceiver attached to the housing;
    at least one sensor for monitoring a physiological condition of the animal;
    at least one stimulus device attached to the housing; and
    a processor in electronic communication with the transceiver and the at least one stimulus device; and
    wherein the processor receives and stores a predetermined area in which an animal is to be confined, the predetermined area being defined by a boundary made up of a plurality of GPS coordinates; and
    wherein the transceiver receives at least one location signal indicating a position of an animal upon which the transceiver is mounted via the housing; and
    wherein the processor receives the at least one location signal indicating the position of the animal from the transceiver; and
    wherein the processor determines whether the animal is within a predetermined distance of the boundary of the predetermined area based upon the at least one location signal; and
    upon a determination that the animal is within the predetermined distance of the boundary of the predetermined area, the processor causes a stimulus to be administered to the animal via the at least one stimulus device; and
    wherein the processor determines a trajectory of the animal based on the at least one GPS location signal, and upon a determination that the trajectory of the animal is towards the boundary of the predetermined area, the processor causes the stimulus to be administered to the animal via the at least one stimulus device such that the animal is directed away from the boundary.

2. The apparatus of claim 1, wherein the housing is sized and configured to be mounted about the head of the animal.

3. The apparatus of claim 1, wherein the at least one stimulus device is a device that emits at least one of an electric shock, a vibration, a light emission, and a sound.

4. The apparatus of claim 1, wherein the processor receives a signal from the at least one sensor that comprises physiological information regarding the animal.

5. The apparatus of claim 1, wherein the location signal is a Global Positioning System ("GPS") location signal.

6. The apparatus of claim 1, wherein the transceiver transmits the signal from the at least one sensor such that the signal is received by a computing device that stores the physiological information regarding the animal in a database.

7. The apparatus of claim 1, wherein the boundary of the predetermined area is input by a user.

8. The apparatus of claim 1, wherein the boundary of the predetermined area changes periodically.

9. The apparatus of claim 1, further comprising a rechargeable battery attached to the housing, wherein the rechargeable battery provides power to the control system.

10. The apparatus of claim 1, further comprising a device for delivery of a medication.

11. The apparatus of claim 1, further comprising a camera and wherein the transceiver transmits information received by the camera.

12. The apparatus of claim 1, wherein the predetermined distance is a first predetermined distance and wherein the predetermined area is a first predetermined area; and
    wherein the processor determines whether the animal is within a second predetermined distance of a boundary of the second predetermined area based upon the at least one location signal, the boundary of the second predetermined area being defined by a plurality of GPS coordinates; and
    upon a determination that the animal is within the second predetermined distance of the boundary of the second predetermined area, the processor causes a stimulus to be administered to the animal via the at least one stimulus device.

13. The apparatus of claim 12, wherein the boundary of the second predetermined area overlaps the boundary of the first predetermined area.

14. The apparatus of claim 1, wherein the housing is a first housing, the transceiver is a first transceiver, the at least one stimulus device is at least one first stimulus device, the predetermined distance is a first predetermined distance, the predetermined area is a first predetermined area, the at least one location signal is a at least one first location signal, and the plurality of GPS coordinates is a first plurality of GPS coordinates, and the apparatus further comprises:
    a second housing;
    a second transceiver attached to the second housing;
    at least one second stimulus device attached to the second housing; and
    wherein the processor is in electronic communication with the second transceiver and the at least one second stimulus device; and
    wherein the second transceiver receives at least one second location signal indicating a position of a second animal upon which the second transceiver is mounted via the second housing; and
    wherein the processor receives the at least one second location signal indicating the position of the second animal; and
    wherein the processor determines whether the second animal is within a second predetermined distance of a boundary of a second predetermined area based upon the at least one second location signal, the boundary of the second predetermined area being defined by a second plurality of GPS coordinates; and upon a determination that the second animal is within the second predetermined distance of the boundary of the second predetermined area, the processor causes a stimulus to be administered the second animal via the at least one second stimulus device.

15. The apparatus of claim 14, wherein there is a buffer area between the boundary of the first predetermined area and the boundary of the second predetermined area.

16. An apparatus for monitoring and controlling an animal comprising:
   a housing;
   a transceiver attached to the housing;
   at least one sensor for monitoring a physiological condition of the animal;
   at least one stimulus device attached to the housing; and
   a processor in electronic communication with the transceiver and the at least one stimulus device; and
   wherein the processor receives and stores a predetermined area in which an animal is to be confined, the predetermined area being defined by a boundary made up of a plurality of GPS coordinates; and
   wherein the transceiver receives at least one location signal indicating a position of an animal upon which the transceiver is mounted via the housing; and
   wherein the processor receives the at least one location signal indicating the position of the animal from the transceiver; and
   wherein the processor determines whether the animal is within a predetermined distance of the boundary of the predetermined area based upon the at least one location signal; and
   upon a determination that the animal is within the predetermined distance of the boundary of the predetermined area, the processor causes a stimulus to be administered to the animal via the at least one stimulus device; and
   wherein the at least one stimulus device comprises at least one first stimulus device associated with a first section of the animal and at least one second stimulus device associated with a second section of the animal; and
   wherein the least one first stimulus device and the at least one second stimulus device are configured to provide stimulus to the animal to drive the animal in a first direction or a second direction, respectively; and
   wherein the processor determines a trajectory of the animal based on the at least one GPS location signal; and
   upon a determination that the trajectory of the animal is towards the boundary of the predetermined area in a third direction, the processor causes the stimulus to be administered to the animal via the at least one first stimulus device or the at least one second stimulus device such that the animal is directed away from the boundary of the predetermined area based on which of the first side or the second side of the animal is closest to the boundary.

17. An apparatus for monitoring and controlling an animal comprising:
   a housing;
   a transceiver attached to the housing;
   a plurality of stimulus devices attached to the housing; and
   a processor in electronic communication with the transceiver and the plurality of stimulus devices; and
   wherein the processor receives and stores a predetermined area in which the animal is to be confined, the predetermined area being defined by a boundary made up of a plurality of GPS coordinates; and
   wherein the transceiver receives at least one location signal indicating a position of an animal upon which the transceiver is mounted via the housing; and
   wherein the processor receives the at least one location signal indicating the position of the animal from the transceiver; and
   wherein the processor determines a direction of movement of the animal based on the at least one location signal and determines whether the animal is within a predetermined distance of the boundary of the predetermined area; and
   upon a determination that the animal is within the predetermined distance of the boundary of the predetermined area, the processor selectively activates at least one stimulus device of the plurality of stimulus devices based on the determination of the direction of movement of the animal such that the animal is directed away from the boundary of the predetermined area; and
   wherein the processor determines a trajectory of the animal based on the at least one GPS location signal, and upon a determination that the trajectory of the animal is towards the boundary of the predetermined area, the processor causes the stimulus to be administered to the animal via the at least one stimulus device such that the animal is directed away from the boundary.

18. An apparatus for monitoring and controlling an animal comprising:
   a housing;
   a transceiver attached to the housing;
   a plurality of stimulus devices attached to the housing; and
   a processor in electronic communication with the transceiver and the plurality of stimulus devices; and
   wherein the processor receives and stores a predetermined area in which the animal is to be confined, the predetermined area being defined by a boundary made up of a plurality of GPS coordinates; and
   wherein the transceiver receives at least one location signal indicating a position of an animal upon which the transceiver is mounted via the housing; and
   wherein the processor receives the at least one location signal indicating the position of the animal from the transceiver; and
   wherein the processor determines a direction of movement of the animal based on the at least one location signal and determines whether the animal is within a predetermined distance of the boundary of the predetermined area; and
   upon a determination that the animal is within the predetermined distance of the boundary of the predetermined area, the processor selectively activates at least one stimulus device of the plurality of stimulus devices based on the determination of the direction of movement of the animal such that the animal is directed away from the boundary of the predetermined area; and
   wherein the at least one stimulus device comprises at least one first stimulus device associated with a first section of the animal and at least one second stimulus device associated with a second section of the animal; and
   wherein the least one first stimulus device and the at least one second stimulus device are configured to provide stimulus to the animal to drive the animal in a first direction or a second direction, respectively; and
   wherein the processor determines a trajectory of the animal based on the at least one GPS location signal; and upon a determination that the trajectory of the animal is towards the boundary of the predetermined area in a third direction, the processor causes the stimulus to be administered to the animal via the at least one first stimulus device or the at least one second stimulus device such that the animal is directed away from the boundary of the predetermined area based on which of the first side or the second side of the animal is closest to the boundary.

* * * * *